US012755502B2

(12) United States Patent
Xiong

(10) Patent No.: US 12,755,502 B2
(45) Date of Patent: Oct. 6, 2026

(54) SYSTEMS AND METHODS FOR GENERATING DIMENSIONALLY COHERENT TRAINING DATA

(71) Applicant: HOVER, INC., San Francisco, CA (US)

(72) Inventor: Zhiyao Xiong, San Mateo, CA (US)

(73) Assignee: Hover Inc., San Francisco, CA (US)

( * ) Notice: Subject to any disclaimer, the term of this patent is extended or adjusted under 35 U.S.C. 154(b) by 108 days.

(21) Appl. No.: 18/841,339

(22) PCT Filed: Feb. 23, 2023

(86) PCT No.: PCT/US2023/013749

§ 371 (c)(1),
(2) Date: Aug. 23, 2024

(87) PCT Pub. No.: WO2023/164084

PCT Pub. Date: Aug. 31, 2023

(65) Prior Publication Data

US 2025/0166326 A1 May 22, 2025

Related U.S. Application Data

(60) Provisional application No. 63/313,257, filed on Feb. 23, 2022.

(51) Int. Cl.
*G06T 19/20* (2011.01)
*G06T 1/20* (2006.01)
(Continued)

(52) U.S. Cl.
CPC ................ *G06T 19/20* (2013.01); *G06T 1/20* (2013.01); *G06T 7/74* (2017.01); *G06T 15/04* (2013.01);
(Continued)

(58) Field of Classification Search
None
See application file for complete search history.

(56) References Cited

U.S. PATENT DOCUMENTS

| | | | | |
|---|---|---|---|---|
| 2010/0201682 | A1 | 8/2010 | Quan et al. | |
| 2019/0122411 | A1 * | 4/2019 | Sachs | G06T 7/90 |

(Continued)

OTHER PUBLICATIONS

Zhang, Jiaxin, Tomohiro Fukuda, and Nobuyoshi Yabuki. "Automatic generation of synthetic datasets from a city digital twin for use in the instance segmentation of building facades." Journal of Computational Design and Engineering 9.5 (2022): 1737-1755. (Year: 2022).*

(Continued)

*Primary Examiner* — Sultana M Zalalee

(57) ABSTRACT

System and method are provided for generating training data for feature matching among images of a building structure. The method includes obtaining a model of a building that includes a camera solution and images used to generate the geometric model. The method also includes, for facades of the model: applying a minimum bounding box to a respective facade to obtain a respective facade slice that is a 2-D plane represented in a 3-D coordinate system of the model; and projecting visual data of at least one camera in the camera solution that viewed the respective facade onto a visibility mask associated with the respective facade slice. The method also includes photo-texturing the projected visual data facade slice to one of the facade slices or the geometric model to generate a visual 3-D representation of the building; and generating a training dataset by perturbing the visual 3-D representation.

30 Claims, 20 Drawing Sheets

(51) Int. Cl.

| | |
|---|---|
| ***G06T 7/73*** | (2017.01) |
| ***G06T 15/04*** | (2011.01) |
| ***G06T 17/00*** | (2006.01) |

(52) U.S. Cl.

CPC .... *G06T 17/00* (2013.01); *G06T 2207/20081* (2013.01); *G06T 2207/30244* (2013.01); *G06T 2210/04* (2013.01); *G06T 2210/12* (2013.01); *G06T 2210/44* (2013.01); *G06T 2215/12* (2013.01); *G06T 2219/2016* (2013.01)

(56) References Cited

U.S. PATENT DOCUMENTS

| | | | | |
|---|---|---|---|---|
| 2020/0090001 | A1* | 3/2020 | Zargahi | G06V 10/96 |
| 2020/0320777 | A1* | 10/2020 | Meshry | G06N 3/045 |
| 2020/0342652 | A1* | 10/2020 | Rowell | G06V 10/82 |
| 2021/0142577 | A1 | 5/2021 | Thomas et al. | |
| 2021/0209843 | A1 | 7/2021 | Freund et al. | |
| 2021/0327127 | A1* | 10/2021 | Hinterstoisser | G06T 19/20 |
| 2022/0092792 | A1* | 3/2022 | Chakraborty | G06T 19/20 |
| 2022/0301221 | A1* | 9/2022 | Klein | G06F 18/2431 |
| 2023/0136235 | A1* | 5/2023 | Wang | G06V 20/64<br>701/23 |
| 2023/0260209 | A1* | 8/2023 | Tomaru | G06T 7/40<br>345/419 |

OTHER PUBLICATIONS

Ikeno, Kazunosuke, Tomohiro Fukuda, and Nobuyoshi Yabuki. "An enhanced 3D model and generative adversarial network for automated generation of horizontal building mask images and cloudless aerial photographs." Advanced Engineering Informatics 50 (2021): 101380. (Year: 2021).*

Shoman, Sota et al, "REST: Real-to-Synthetic Transform for Illumination Invariant Camera Localization", Cornell University Library, Mar. 26, 2018, Arxiv.org, 201 Olin Library, Cornell University, Ithaca, NY, 14853, United States (9 pages).

Iwaszczuk, Dorota, "Automatic texturing of 3D models of urban areas using image sequences from airborne TIR cameras", PhD Dissertation—Technische Universität München, Ingenieurfakultät Bau Geo Umwelt Photogrammetrie und Fernerkundung, 2015 (142 pages).

Larsen, C et al, "3D Reconstruction of Buildings with Automatic Facade Refinement", SAT 2015 18th International Conference, Austin, TX, USA, Lecture Notes in Computer Science, Sep. 24-27, 2015; pp. 451-460, Springer, Berlin, Heidelberg, Germany (11 pages).

Katartzis, A., Supplementary European Search Report, European app. No. EP 23 76 0664, EPO, Munich, Nov. 14, 2025 (3 pages).

Hover Inc., PCT/US2023/013749, International Search Report and Written Opinion, May 26, 2023, 15 pgs.

Hover Inc., PCT/US2023/013749, International Preliminary Report on Patentability, Aug. 27, 2024, 5 pgs.

Narayanan et al., "Virtual worlds using computer vision," Proceedings 1998 IEEE and ATR Workshop on Computer Vision for Virtual Reality Based Human Communications, Bombay, India, 1998 (also available at: https///publications.ri.cmu.edu/storage/publications/pub_files/pub2/narayanan_p_j_1998_2/narayanan_p_j_1998_2.pdf) (12 pages).

* cited by examiner

SYSTEMS AND METHODS FOR GENERATING DIMENSIONALLY COHERENT TRAINING DATA

CROSS REFERENCE TO RELATED APPLICATIONS

This application is a United States National Stage Application filed under 35 U.S.C. § 371 of PCT Patent Application Serial No. PCT/US2023/013749, filed Feb. 23, 2023, entitled "Systems and Methods for Generating Dimensionally Coherent Training Data," which claims the benefit of and priority to U.S. Provisional Application No. 63/313,257, filed Feb. 23, 2022, entitled "Systems and Methods for Generating Dimensionally Coherent Training Data," each of which is incorporated by reference herein in its entirety.

TECHNICAL FIELD

The disclosed implementations relate generally to 3-D reconstruction and more specifically to systems and methods for generating dimensionally coherent training data.

BACKGROUND

3-D building models and visualization tools can produce significant cost savings. Using accurate 3-D models of properties, homeowners, for instance, can estimate and plan every project. With near real-time feedback, contractors could provide customers with instant quotes for remodeling projects. Interactive tools can enable users to view objects (e.g., buildings) under various conditions (e.g., at different times, under different weather conditions). 3-D models may be reconstructed from various input image data, but excessively large image inputs, such as video input, may require costly computing cycles and resources to manage, whereas image sets with sparse data fail to capture adequate information for realistic rendering or accurate measurements for 3-D models.

Traditional methods generate a dataset for interest point detection training by taking at least one image, annotating it with reference points, and applying a series of homographies to the image to produce warped/synthetic images with warped reference points of the original image(s). The trained network may then recognize the same feature in multiple images when deployed in the field because it had learned the various ways a feature may look from different perspectives. Feature detection across images is valuable to determine how a camera has changed positions across images. By training a network with homographies of images, the network may learn more ways a given feature looked in a self-supervised fashion. In other words, instead of receiving thousands of images of a feature generated and annotated by humans, the network is biased to spot and learn that a particular feature can look a certain way in millions of automated views while "knowing" it is the same.

While these traditional methods can work for correspondence training where the feature should be similarly constrained across different views, there are several shortcomings. For example, the conventional methods only generate additional synthetic images similarly in 2D data format, and does not convey or preserve additional details that would be beneficial for training a network expected for use in a 3D reconstruction pipeline. While geometries with only 2D descriptions (e.g. single planar surfaces) may suffice under such a training method, more complex geometries such as a 3D object (e.g. a house) are not well suited to this technique.

A homography will not transform surfaces with different orientations and maintain the ground truth relations between such surfaces. These techniques also treat the entire image equally with respective to its homography, without appreciating that only a certain object within an image may matter. The entire image is warped in this technique, which introduces variability of relevance for non-relevant data, or incoherence of the data in general. Warping a 2D image transforms all pixels according to the change of the degree of freedom; because all pixels reside on a 2D plane of the image, any 3D dimensional relationships of an object in the image are subsumed by the change. In other words, 3D geometries and relationships of non-coplanar surfaces that should not transform according to a 2D transform are inaccurately displayed by such a technique. This may lead to false positives or false negatives in real-world scenarios relying on a model trained in this way. For example, during training set creation a warped image may crop out portions of the object of interest, or disproportionately show the sky or minimize portions of an object (e.g. a house) observed in the image. Inappropriate cropping may also result; for example, an image rotated 45 degrees away from the render camera reduces the effective size of the image that camera can view, and there is no information "filling" the loss within the render camera's frustum by the 2D image perturbation. Taken together, the trained network is not exposed to real life observations during training and is therefore prone to errors when evaluating data in real time after training.

SUMMARY

Accordingly, there is a need for systems and methods for generating improved training data for feature matching algorithms. According to some implementations, 2D images are first transformed into a 3D visualization preserving the original visual data and the spatial representations and relationships they captured. Training data may be generated by perturbing (e.g., warping) the 3D visualization to generate additional synthetic images or synthetic view, in an efficient manner.

Feature matching techniques across images is valuable, as identifying matched features across images informs the transformation of camera positions between images, and therefore the camera pose(s). With camera poses solved for, it is possible to reconstruct in 3D coordinates the geometry of content within the 2D image at a given camera pose. For example, given an image of a building or a house, it is preferred to train a computer to identify lots of different points of this image, and lots of different points of that house from other camera positions and then to determine which of the detected points are the same. Some implementations use trained networks based on synthetic images with different perspectives of a given point or feature, such that the trained network can identify that same feature when it appears in a different camera's view, despite its different visual appearance from that view.

In some implementations, the problem of data incoherence while training a network by perturbing image sets is solved by instead training on perturbing a 3D representation of an object created from the image set. Data incoherence may manifest as generating synthetic images or data that necessarily are not possible in the real world and therefore will never actually be viewed by an imager using the network trained on the incoherent synthetic data. Data incoherence may manifest as decoupling spatial realities of the image content in order to produce a warped image for training (e.g. the homography of the image breaks an actual dimensional relationship between features of the imaged object). Networks trained on such data are therefore prone to inaccurate matches when deployed, as the training data may conflict with observed data. Maintaining spatial relationships of features in the images improves the networks ability to appropriately match observed features in a real world setting. Stated differently, the problem of false positives or false negatives from a network trained on 2D data is solved by training for feature matches among spatially coherent perturbations of a 3D visual representation. The problem of variability in feature matching training from perturbed 2D images is solved by generating 3D visual representations of an object based on planar reconstruction of visual data. In some examples, the problem of occlusions interfering with generating robust visual data for a 3D visual representation is solved by generating sub-masks or visibility masks of façades within relevant images and applying texture data from images with un-occluded pixels of a respective sub-mask.

Though the techniques as described here relate to generating training data from and for building structures, the techniques may apply to other 3-D objects as well.

Systems, methods, devices, and non-transitory computer readable storage media for generating training data from and for building structures are disclosed.

(A1) In one aspect, a method is provided for generating training data of a building structure for a feature matching network. The method includes obtaining a geometric multi-dimensional model (sometimes referred to as a geometric model or a 3D model) of a building that includes a camera solution and a plurality of images taken by respective cameras at poses within the camera solution. In some implementations, the geometric model is a CAD model, or other model type depicting geometric relationships and figures but not visual information (e.g. a brick wall may appear as a blank rectangular plane or rectangular plane "filled" or annotated with pixel information to simulate brick rather than use actual brick imagery such as from the plurality of images). The method also includes, for a plurality of façades of the model: applying a minimum bounding box to a respective façade to obtain a respective façade slice that is a 2-D plane represented by the 3-D coordinate system of the model; and projecting visual data of at least one camera in the camera solution that viewed the respective façade onto the respective façade slice. The method also includes photo-texturing the projected visual data on each façade slice to generate a visual 3-D representation of the building; and generating a training dataset by perturbing the visual 3-D representation.

(A2) In some implementations of A1, the method further includes determining cameras within the camera solution that viewed the respective façade by reprojecting boundaries of the minimum bounding box into one or more images of the plurality of images within the camera solution and detecting alignment of the bounding box with a façade. Because the bounding box is fit to a façade, it will be represented according to the same coordinate space as the model that façade falls upon and therefore reprojecting the bounding box into other images of the camera solution associated with that model will necessarily reproject the bounding box into the other images using the same coordinate system. A bounding box reprojected into an image that cannot view the façade that bounding box was fit to will not align to any geometry as viewed from such image.

(A3) In some implementations of any of A1-A2, a camera view of a respective façade includes one or more occlusions, such as from architectural elements of the building object itself. The method further includes generating cumulative texture information for the respective façade based on visual information of one or more additional cameras of the camera solution.

(A4) In some implementations of A3, generating the cumulative texture information includes projecting visual information from the plurality of images to a visibility mask for the respective façade slice, and aggregating the visual information.

(A5) In some implementations of any of A1-A2, projecting visual data of the cameras that viewed the respective façade includes: for each camera that viewed the respective façade: transforming image data of the respective façade to generate a respective morphed image, wherein a plane of the respective façade is orthogonal relative to an optical axis of the respective camera; and merging visual data from each morphed image to generate cumulative visual data for the respective façade slice.

(A6) In some implementations of A5, transforming the image data of the respective façade uses a homogenous transformation.

(A7) In some implementations of A5, generating the respective morphed image orients a plane of the respective façade orthogonal to an optical axis of a virtual camera viewing the transformed image data.

(A8) In some implementations of A5, merging the visual data includes: selecting a base template from amongst visibility masks for the respective façade. The base template has a largest volume of observed pixels when compared to other visibility masks; applying visual data from an image of a set of partially occluded images that shows the respective façade; and importing visual information for pixels from other images corresponding to unobserved area(s) of the base template.

(A9) In some implementations of any of A1-A2, the perturbing is performed relative to one or more cameras of the camera solution, each perturbation performed on the building in that position.

(A10) In some implementations of any of A1-A2, the perturbing is performed relative to one or more virtual cameras viewing the visual 3-D representation.

(A11) In some implementations of any of A1-A2, the perturbing includes one or more of: moving, rotating, zooming, and combinations thereof. A plurality of images of the model at perturbed positions, less the image information of the cameras within the camera solution, is taken to generate the training set of spatially coherent 3D visual representations of the building object. Common features across each perturbed image can then be identified, and a network trained to recognize feature matches across images given camera changes (simulated by the perturbed 3D representation).

(A12) In some implementations of any of A1-A2, the method further includes capturing new images of the visual 3-D representation from each perturbed position.

(A12) In some implementations of any of A1-A2, the method further includes performing feature matching by identifying common features across images of the training dataset for determining camera position transformations between images and camera poses.

(B1) In another aspect, a method is provided for generating training data for feature matching among images of a building structure. In some implementations, the training data is embedded with 3D spatial relationships among the geometry of the building structure. The method includes obtaining a geometric multi-dimensional model (sometimes referred to as a geometric model or a 3D model) of a building that includes a camera solution and a plurality of images taken by respective cameras at poses within the camera solution. In some implementations, the geometric model is a CAD model, or other model type depicting geometric relationships and figures but not visual information (e.g., a brick wall may appear as a blank rectangular plane or rectangular plane "filled" or annotated with pixel information to simulate brick rather than use actual brick imagery such as from the plurality of images). The method also includes, for a plurality of facades of the model, generating a façade slice for each of a plurality of facades of the model, and identifying each camera of the camera solution that observes or captured the respective façade. The method also includes, for each identified camera for a respective façade, identifying pixels in that camera's image that comprise visual data associated with the façade slice. The pixels may be identified according to a visibility mask, such as a reprojection of the façade slice as one or more segmentation masks for the image. The method also includes generating an aggregate façade view of cumulative visual information associated with the façade slice. The combined visual data, e.g. pixels, for the façade slice, according to each identified camera are combined and photo-textured to the façade slice, or the geometric model, to generate a 3D representation of the building structure. The 3D representation can then be perturbed to a variety of positions and transforms, and additional images of the perturbed 3D representation taken at each perturbation; each additional image may be used as a training data image in a resultant training dataset.

(B2) In some implementations of B1, the façade slice is isolated as a 2D representation of the respective façade, and defined in 3D coordinates as with the 3D model.

(B3) In some implementations of B2, the façade is isolated to create a façade slice by applying a bounding box to the model for the respective façade and cropping the content within the bounding box. In some implementations, the bounding box is fit to an already isolated façade slice.

(B4) In some implementations of B3, cameras that observe a respective façade are identified by reprojecting a bounding box for the façade slice into the plurality of images and recording which cameras observe the reprojected bounding box.

(B5) In some implementations of any of B1-B4, the visibility mask is a classification indicating one or more classified pixels related to a façade slice.

(B6) In some implementations of any of B1-B4, the method for generating the aggregate façade view further includes generating one or more visual data templates using the images from the identified cameras that observe the respective façade. A visual data template may be a modified image that displays the visual data (e.g., the observed pixels within an image) according to a camera's visibility mask. In other words, the pixels of an image that coincide with classified pixels of a visibility mask are used to create the modified image.

(B7) In some implementations of B6, each visual data template is transformed to a common perspective.

(B8) In some implementations of B7, the transformation is a homogenous transform that transforms the modified image such that its plane is orthogonal to an optical axis of a camera (e.g., virtual camera) viewing or displaying the image.

(B9) In some implementations of B7, aligning the visual data templates to a common perspective aligns associated bounding boxes for the visual data templates, such as the bounding box associated with the façade slice that governed the visibility mask for the visual data template.

(B10) In some implementations of any of B1-B4, a base visual data template is selected for a given façade or façade slice. In some implementations, a visual data template is selected as the base visual data template when it has the most observed pixels, e.g. its associated visibility mask has the highest quantity of classified observed pixels, of a given façade.

(B11) In some implementations of (B10), the pixels from additional visual data templates is added to that base template. In this way, portions of a façade slice that are unobserved by the base visual data template are filled in by the pixels of the additional visual data templates.

(B12) In some implementations of any of B1-B4, perturbing the 3D model is performed by translating, rotating, zooming, or similar actions relative to a camera position of the camera solution.

(B13) In some implementations of any of B1-B4, perturbing the 3D model is performed by translating, rotating, zooming, or similar actions relative to a virtual camera position (e.g., a render camera position other than a position of a camera within the camera solution).

(B14) In some implementations of any of B1-B4, perturbing the 3D model is performed by translating, rotating, zooming, or combinations thereof.

(B15) In some implementations of any of B1-B4, feature matches across the captured images of a perturbed 3D representation that form the training dataset are obtained and form part of a data file for a trained network to use in a deployed setting.

(B16) In some implementations of any of B1-B4, each photo-textured façade slice is reassembled according to the 3D coordinates of the 3D model to create a 3D representation of the visual data captured by the images of the camera solution.

In another aspect, a computer system includes one or more processors, memory, and one or more programs stored in the memory. The programs are configured for execution by the one or more processors. The programs include instructions for performing any of the methods described herein.

In another aspect, a non-transitory computer readable storage medium stores one or more programs configured for execution by one or more processors of a computer system. The programs include instructions for performing any of the methods described herein.

BRIEF DESCRIPTION OF THE DRAWINGS

Like reference numerals refer to corresponding parts throughout the drawings.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details or in alternate sequences or combinations. In other instances, well-known methods, procedures, components, and circuits have not been described in detail so as not to unnecessarily obscure aspects of the implementations.

Figure 1:
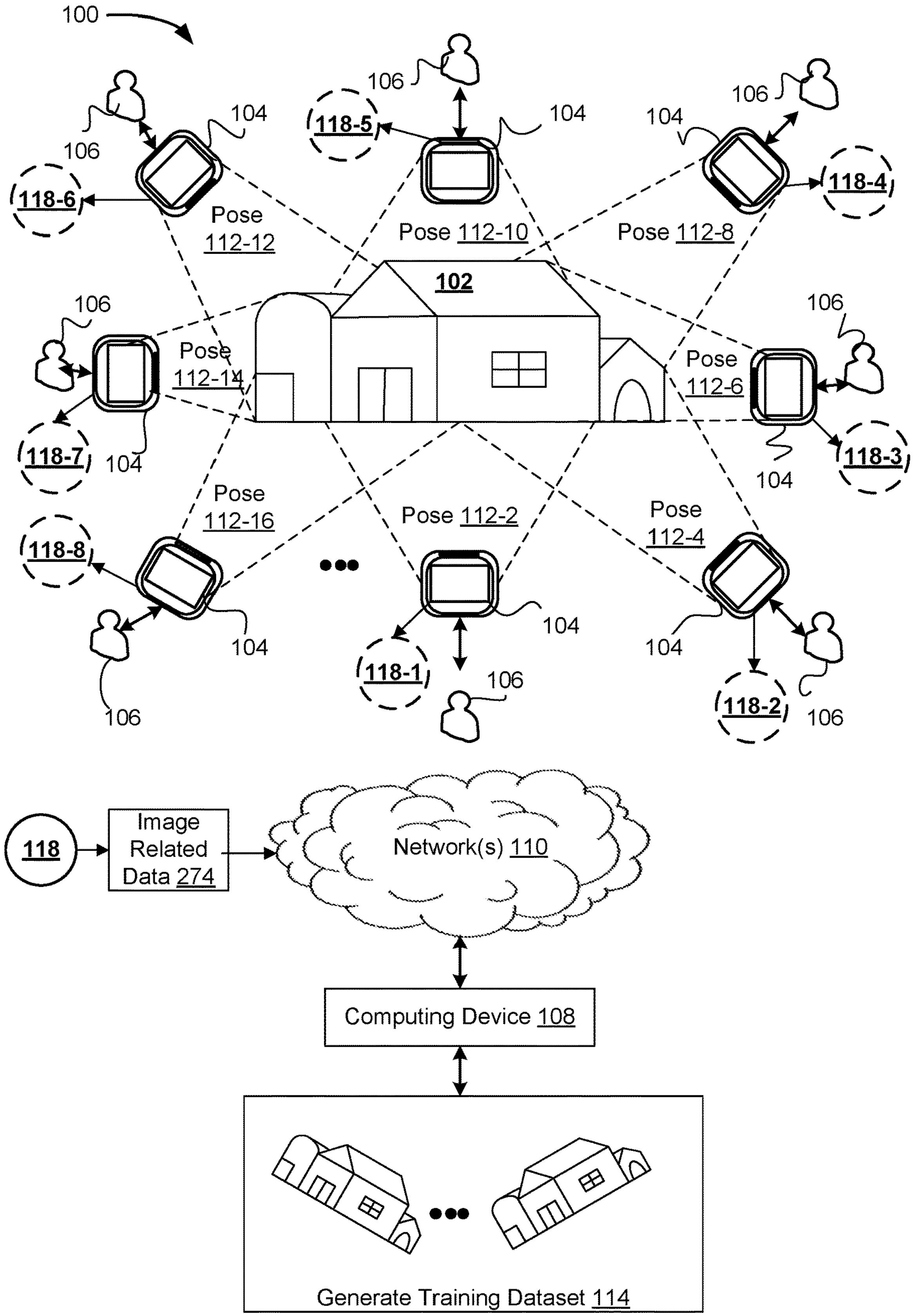
FIG. 1 is a schematic diagram of a computing system for generation of training data for building structures, in accordance with some implementations.

FIG. 1 is a block diagram of a computer system 100 that enables generation of training data for a building structure, in accordance with some implementations. In some implementations, the computer system 100 includes image capture devices 104, and a computing device 108.

An image capture device 104 communicates with the computing device 108 through one or more networks 110. The image capture device 104 provides image capture functionality (e.g., take photos of images) and communications with the computing device 108. In some implementations, the image capture device is connected to an image preprocessing server system (not shown) that provides server-side functionality (e.g., preprocessing images, such as creating textures, storing environment maps (or world maps) and images and handling requests to transfer images) for any number of image capture devices 104.

In some implementations, the image capture device 104 is a computing device, such as desktops, laptops, smartphones, and other mobile devices, from which users 106 can capture images (e.g., take photos), discover, view, edit, or transfer images. In some implementations, the users 106 are robots or automation systems that are pre-programmed to capture images of the building structure 102 at various angles (e.g., by activating the image capture image device 104). In some implementations, the image capture device 104 is a device capable of (or configured to) capture images and generate (or dump) world map data for scenes. In some implementations, the image capture device 104 is an augmented reality camera or a smartphone capable of performing the image capture and world map generation functions. In some implementations, the world map data includes (camera) pose data, tracking states, or environment data (e.g., illumination data, such as ambient lighting).

In some implementations, a user 106 walks around a building structure (e.g., the house 102), and takes pictures of the building 102 using the device 104 (e.g., an iPhone) at different poses (e.g., the poses 112-2, 112-4, 112-6, 112-8, 112-10, 112-12, 112-14, and 112-16). Each pose corresponds to a different perspective or a view of the building structure 102 and its surrounding environment, including one or more objects (e.g., a tree, a door, a window, a wall, a roof) around the building structure. Each pose alone may be insufficient to generate a reference pose or reconstruct a complete 3-D model of the building 102, but the data from the different poses can be collectively used to generate reference poses and the 3-D model or portions thereof, according to some implementations. In some instances, the user 106 completes a loop around the building structure 102. In some implementations, the loop provides validation of data collected around the building structure 102. For example, data collected at the pose 112-16 is used to validate data collected at the pose 112-2.

At each pose, the device 104 obtains (118) images of the building 102, and/or world map data (described below) for objects (sometimes called anchors) visible to the device 104 at the respective pose. For example, the device captures data 118-1 at the pose 112-2, the device captures data 118-2 at the pose 112-4, and so on. As indicated by the dashed lines around the data 118, in some instances, the device fails to capture the world map data, illumination data, or images. For example, the user 106 switches the device 104 from a landscape to a portrait mode, or receives a call. In such circumstances of system interruption, the device 104 fails to capture valid data or fails to correlate data to a preceding or subsequent pose. Some implementations also obtain or generate tracking states (further described below) for the poses that signify continuity data for the images or associated data. The data 118 (sometimes called image related data 274) is sent to a computing device 108 via a network 110, according to some implementations.

Although the description above refers to a single device 104 used to obtain (or generate) the data 118, any number of devices 104 may be used to generate the data 118. Similarly, any number of users 106 may operate the device 104 to produce the data 118.

In some implementations, the data 118 is collectively a wide baseline image set, that is collected at sparse positions (or poses 112) around the building structure 102. In other words, the data collected may not be a continuous video of the building structure or its environment, but rather still images or related data with substantial rotation or translation between successive positions. In some embodiments, the data 118 is a dense capture set, wherein the successive frames and poses 112 are taken at frequent intervals. Notably, in sparse data collection such as wide baseline differences, there are fewer features common among the images and deriving a reference pose is more difficult or not possible. Additionally, sparse collection also produces fewer corresponding real-world poses and filtering these, as described further below, to candidate poses may reject too many real-world poses such that scaling is not possible.

The computing device 108 obtains the image-related data 274 (which may include a geometric model of the building that in turn includes a camera solution and images of the building from camera positions within the camera solution) via the network 110. Based on the data received, the computing device 108 generates training datasets of the building structure 102. As described below in reference to FIGS. 3-4, in various implementations, the computing device 108 applies a minimum bounding box to facades of the model, projects visual data of cameras in the camera solution that viewed the facades, photo-textures the projected visual data on each façade slice to generate a 3D visual representation of the building, applies the photo-textured façade slice to the model (or assembles an aggregate of photo-textured façade slices according to the 3-D coordinate system of the model to generate a photo-textured 3-D model) and generates (114) training dataset(s) by perturbing the visual 3-D representation and generating new image data at each perturbation.

The computer system 100 shown in FIG. 1 includes both a client-side portion (e.g., the image capture devices 104) and a server-side portion (e.g., a module in the computing device 108). In some implementations, data preprocessing is implemented as a standalone application installed on the computing device 108 or the image capture device 104. In addition, the division of functionality between the client and server portions can vary in different implementations. For example, in some implementations, the image capture device 104 uses a thin-client module that provides only image search requests and output processing functions, and delegates all other data processing functionality to a backend server (e.g., the server system 108). In some implementations, the computing device 108 delegates image processing functions to the image capture device 104, or vice-versa.

The communication network(s) 110 can be any wired or wireless local area network (LAN) or wide area network (WAN), such as an intranet, an extranet, or the Internet. It is sufficient that the communication network 110 provides communication capability between the image capture devices 104, the computing device 108, or external servers (e.g., servers for image processing, not shown). Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

The computing device 108 or the image capture devices 104 are implemented on one or more standalone data processing apparatuses or a distributed network of computers. In some implementations, the computing device 108 or the image capturing devices 104 also employ various virtual devices or services of third party service providers (e.g., third-party cloud service providers) to provide the underlying computing resources or infrastructure resources.

Figure 2A:
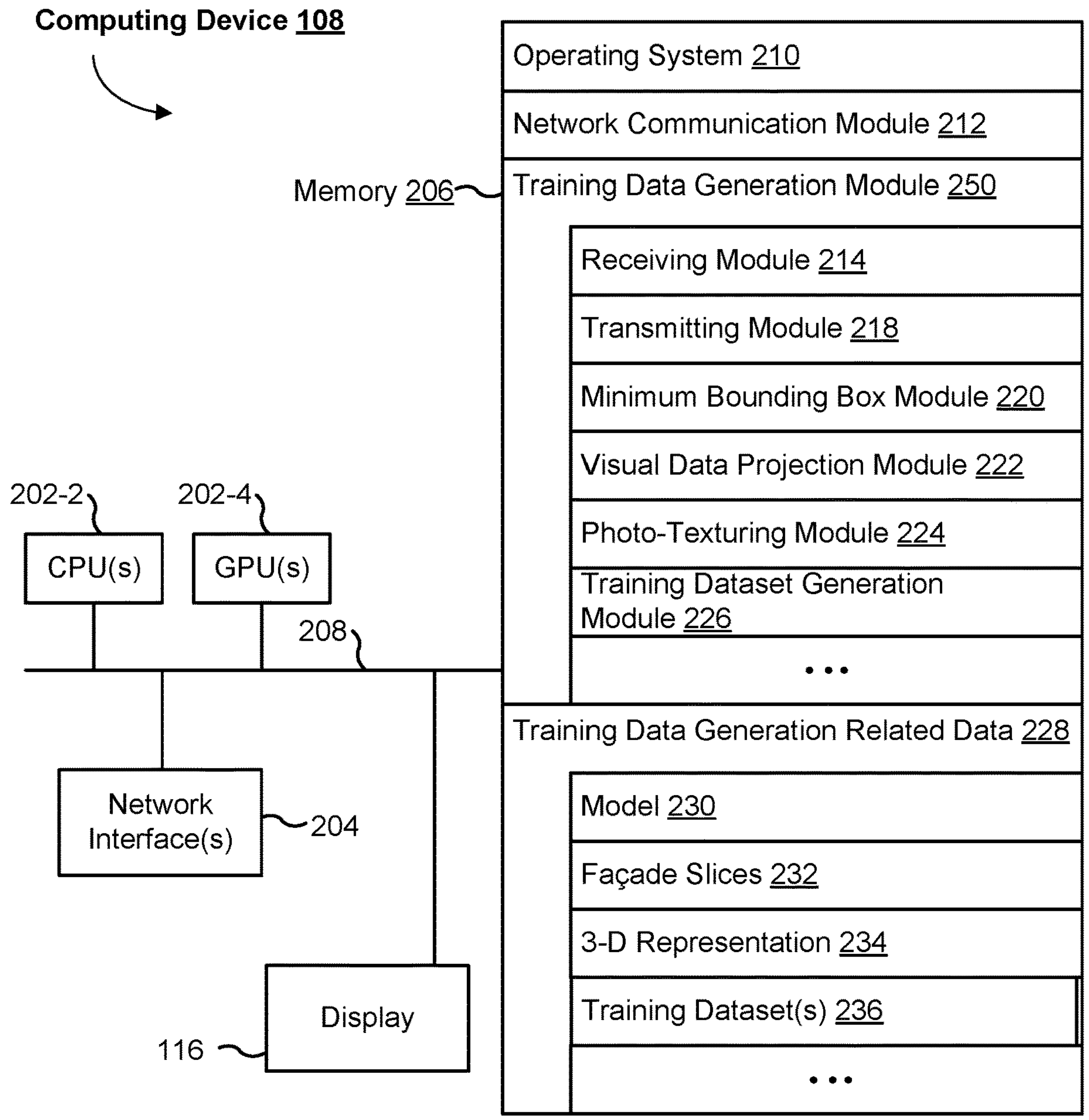
FIG. 2A is a block diagram of a computing device for generating training data of building structures, in accordance with some implementations.

FIG. 2A is a block diagram illustrating the computing device 108 in accordance with some implementations. The server system 108 may include one or more processing units (e.g., CPUs 202-2 or GPUs 202-4), one or more network interfaces 204, one or more memory units 206, and one or more communication buses 208 for interconnecting these components (e.g. a chipset).

The memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, optionally, includes one or more storage devices remotely located from one or more processing units 202. The memory 206, or alternatively the non-volatile memory within the memory 206, includes a non-transitory computer readable storage medium. In some implementations, the memory 206, or the non-transitory computer readable storage medium of the memory 206, stores the following programs, modules, and data structures, or a subset or superset thereof:

- operating system 210 including procedures for handling various basic system services and for performing hardware dependent tasks;
- network communication module 212 for connecting the computing device 108 to other computing devices (e.g., image capture devices 104, or image-related data sources) connected to one or more networks 110 via one or more network interfaces 204 (wired or wireless);
- training data generation module 250, which generates training data for building(s) which includes, but is not limited to:
  - a receiving module 214 for receiving information related to images. For example, the module 214 handles receiving a geometric model of a building that includes a camera solution and a plurality of images from the image capture devices 104 associated with camera poses within the camera solution, or image-related data sources. In some implementations, the receiving module also receives processed images from the GPUs 202-4 for rendering on the display 116;
  - a transmitting module 218 for transmitting image-related information and/or training datasets. For example, the module 218 handles transmission of image-related information to the GPUs 202-4, the display 116, or the image capture devices 104;
  - a minimum bounding box module 220 for applying a minimum bounding box to a façade to obtain a façade slice, or to an isolated façade slice, that is a 2-D plane represented in a 3-D coordinate system of the model obtained by the receiving module 214;
  - a visual data projection module 222 that projects visual data of at least one camera in a camera solution that viewed a façade onto a façade slice or as a visual data template;
  - a photo-texturing module 224 that photo-textures projected visual data on façade slice(s) to a 3-D model to generate a photo-textured 3-D visual representation of the building; and
  - a training dataset generation module 226 that generates a training dataset by or from perturbing a visual 3-D representation;
- one or more server database of training data generation related data 228 storing data for training data generation, including but not limited to:
  - model(s) 230 that stores models received by the receiving module 214;
  - façade slices 232 that stores façade slices isolated from the geometric model;
  - 3-D representations 234 that store visual 3-D representation generated by the photo-texturing module 224; and
  - Training dataset(s) 236 that stores training datasets generated by the training dataset generation module 226.

The above description of the modules is only used for illustrating the various functionalities. In particular, one or more of the modules may be combined in larger modules to provide similar functionalities.

In some implementations, an image database management module (not shown) manages multiple image repositories, providing methods to access and modify image-related data that can be stored in local folders, NAS or cloud-based storage systems. In some implementations, the image database management module can even search online/offline repositories. In some implementations, offline requests are handled asynchronously, with large delays or hours or even days if the remote machine is not enabled. In some implementations, an image catalog module (not shown) manages permissions and secure access for a wide range of databases.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Although not shown, in some implementations, the computing device 108 further includes one or more I/O interfaces that facilitate the processing of input and output associated with the image capture devices 104 or external server systems (not shown). One or more processors 202 obtain images and information related to images from image-related data 274 (e.g., in response to a request to generate training datasets for a building), processes the images and related information, and generates training datasets. I/O interfaces facilitate communication with one or more image-related data sources (not shown, e.g., image repositories, social services, or other cloud image repositories). In some implementations, the computing device 108 connects to image-related data sources through I/O interfaces to obtain information, such as images stored on the image-related data sources.

Figure 2B:
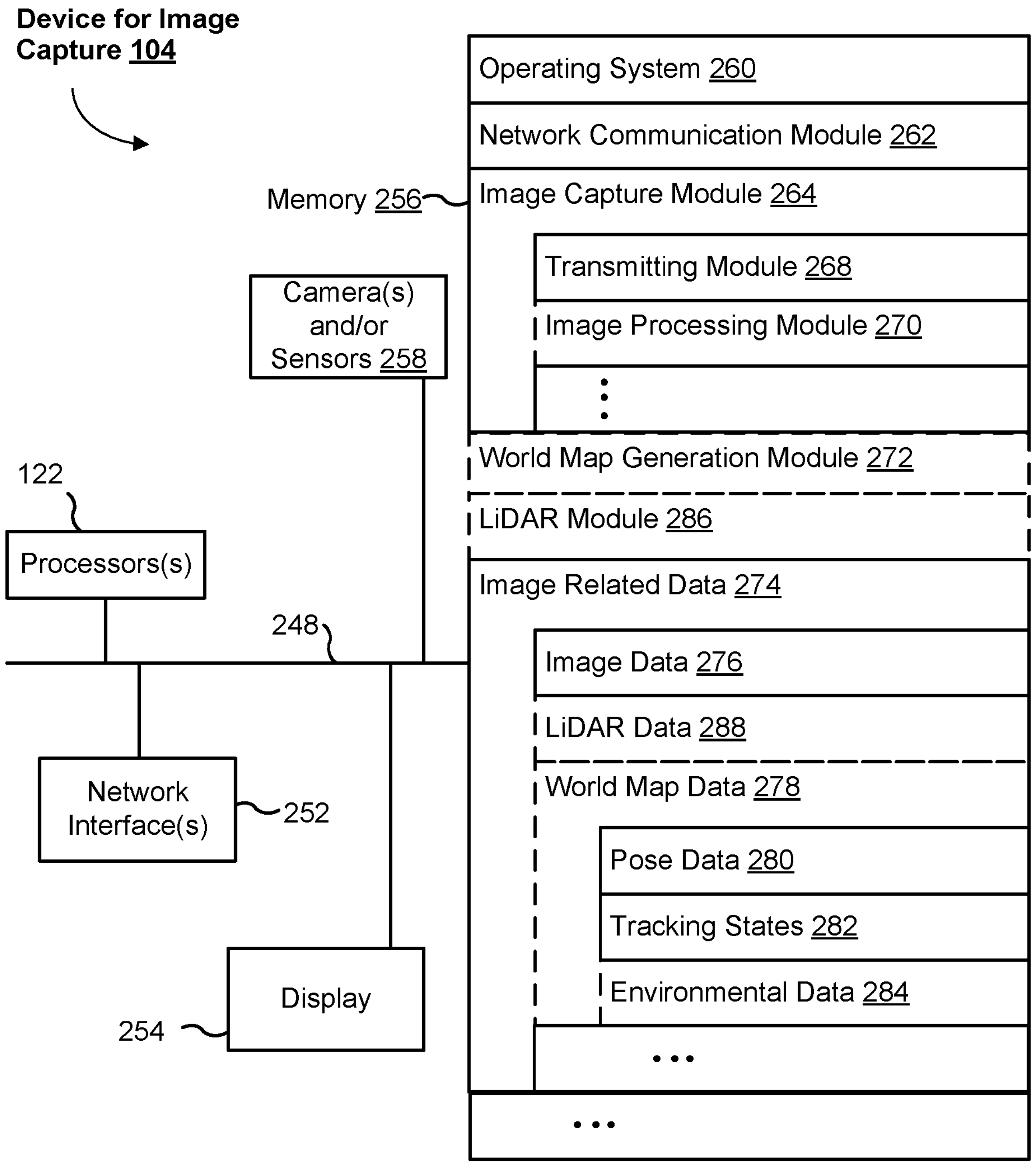
FIG. 2B is a block diagram of a device capable of capturing images, in accordance with some implementations.

FIG. 2B is a block diagram illustrating a representative image capture device 104 that is capable of capturing (or taking photos of) images 276 of building structures (e.g., the house 102) and running an augmented reality framework from which world map data 278 may be extracted, in accordance with some implementations. The image capture device 104, typically, includes one or more processing units (e.g., CPUs or GPUs) 122, one or more network interfaces 252, memory 256, optionally display 254, optionally one or more sensors (e.g., IMUs), and one or more communication buses 248 for interconnecting these components (sometimes called a chipset).

Memory 256 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 256, optionally, includes one or more storage devices remotely located from one or more processing units 122. Memory 256, or alternatively the non-volatile memory within memory 256, includes a non-transitory computer readable storage medium. In some implementations, memory 256, or the non-transitory computer readable storage medium of memory 256, stores the following programs, modules, and data structures, or a subset or superset thereof:

- an operating system 260 including procedures for handling various basic system services and for performing hardware dependent tasks;
- a network communication module 262 for connecting the image capture device 104 to other computing devices (e.g., the computing device 108 or image-related data sources) connected to one or more networks 110 via one or more network interfaces 252 (wired or wireless);
- an image capture module 264 for capturing (or obtaining) images captured by the device 104, including, but not limited to:
  - a transmitting module 268 to transmit image-related information (similar to the transmitting module 218); and
  - an image processing module 270 to post-process images captured by the image capturing device 104. In some implementations, the image capture module 270 controls a user interface on the display 254 to confirm (to the user 106) whether the captured images by the user satisfy threshold parameters for generating 3-D representations. For example, the user interface displays a message for the user to move to a different location so as to capture two sides of a building, or so that all sides of a building are captured;
- optionally, a world map generation module 272 that generates world map or environment map that includes pose data, tracking states, or environment data (e.g., illumination data, such as ambient lighting);
- optionally, a Light Detection and Ranging (LiDAR) module 286 that measuring distances by illuminating a target with laser light and measuring the reflection with a sensor; or
- a database of image-related data 274 storing data for 3-D reconstruction, including but not limited to:
  - a database 276 that stores one or more image data (e.g., image files) or geometric models and camera solutions associated with the geometric models;
  - optionally, a database 288 that stores LiDAR data; and
  - optionally, a database 278 that stores world maps or environment maps, including pose data 280, tracking states 282, or environmental data 284.

Examples of the image capture device 104 include, but are not limited to, a handheld computer, a wearable computing device, a personal digital assistant (PDA), a tablet computer, a laptop computer, a cellular telephone, a smartphone, an enhanced general packet radio service (EGPRS) mobile phone, a media player, a navigation device, a portable gaming device console, a tablet computer, a laptop computer, a desktop computer, or a combination of any two or more of these data processing devices or other data processing devices. In some implementations, the image capture device 104 is an augmented-reality (AR)-enabled device that captures augmented reality maps (AR maps, sometimes called world maps). Examples include Android devices with ARCore, or iPhones with ARKit modules.

In some implementations, the image capture device 104 includes (e.g., is coupled to) a display 254 and one or more input devices (e.g., camera(s) or sensors 258). In some implementations, the image capture device 104 receives inputs (e.g., images) from the one or more input devices and outputs data corresponding to the inputs to the display for display to the user 106. The user 106 uses the image capture device 104 to transmit information (e.g., images) to the computing device 108. In some implementations, the computing device 108 receives the information, processes the information, and sends processed information to the display 116 or the display of the image capture device 104 for display to the user 106.

Some implementations generate a 3D representation of an object. Each pixel of the representation is based on at least one pixel from 2D image(s) used to construct the 3D representation. Instead of, or in addition to, generating a 3D representation of an object based on geometry detected in a 2D image, some implementations generate a dataset for feature matching, using the original visual data in addition to the geometric representation. By generating a 3D accurate representation of the visual data, any perturbing and modification of the representation, such as rotating, or zooming in on a rotated view, that otherwise randomizes views for training, will not only focus the training on the object of relevance of the original 2D images, but also preserve the 3D relationships (e.g. 3D appearances) of all features and points for that object in the representation. Together, these lead to a stronger dataset, resulting in a more robust network when actually deployed as described next. More accurate training data, meaning it more accurately depicts real world environments/scenes, leads to increased accuracy in the field. In other words, a camera is never going to view a warped façade in real life, so training data based on warped images could lead networks predicting false positives or false negatives in feature matching actual observed inputs as the training data included inherently or purposefully inaccurate data.

Techniques described herein can be used to develop new feature matching techniques and for generating training data by perturbing (e.g., by warping) a 3D representation of an object to generate additional synthetic images in a cheap and fast, and geometrically accurate technique. Feature matching across images is useful for identifying matching features across images that informs the transformation of camera positions between images, and therefore the camera pose(s). With camera poses solved for, the techniques can be used to reconstruct in 3D coordinates the geometry of content within the 2D image at a given camera pose.

Figure 3A:
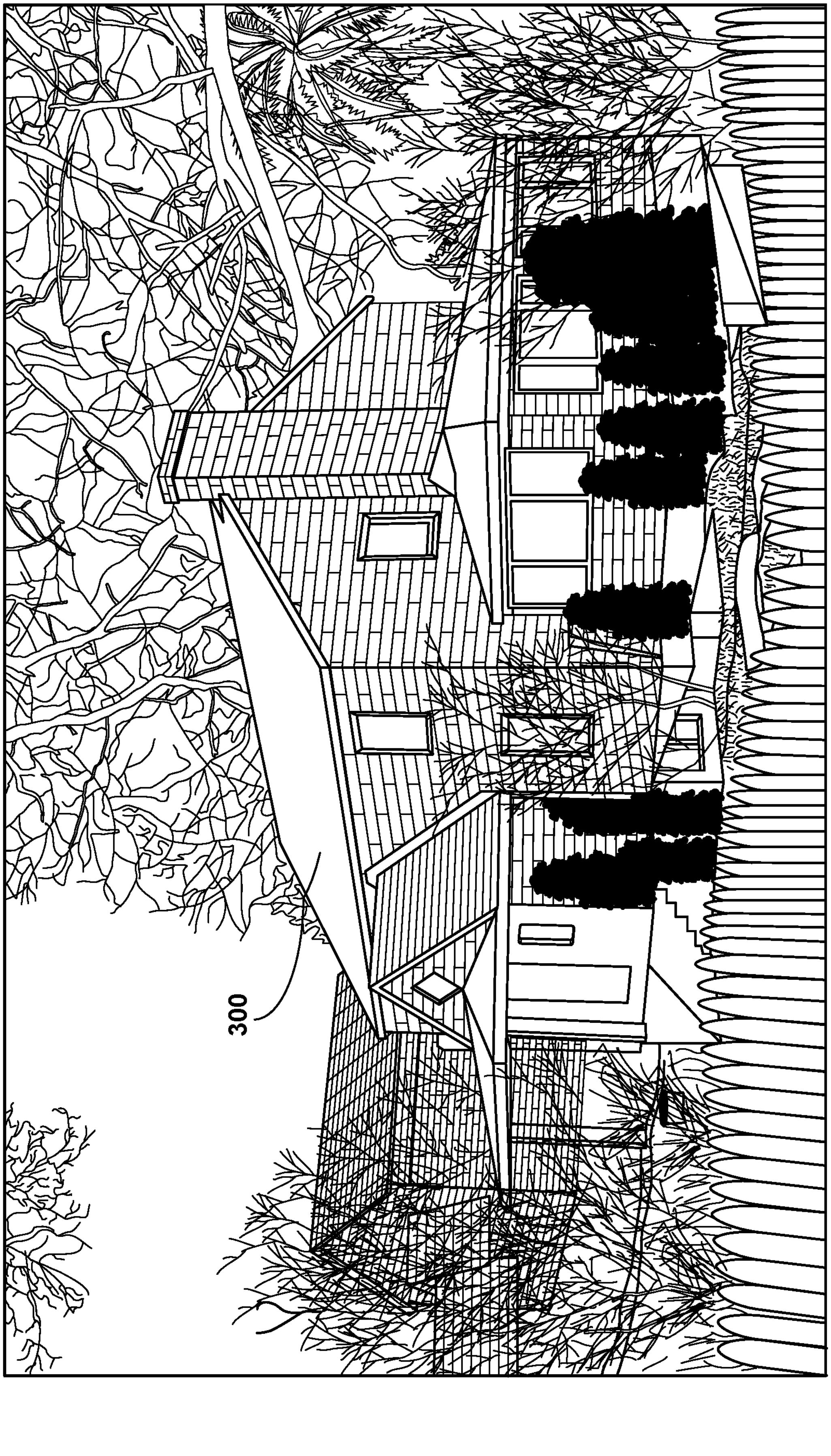
FIG. 3A shows an image of an example building structure 300, according to some implementations.

FIG. 3A shows an image of an example building structure 300 (a house). Conventional methods train a computer to identify different points of this image, and different points of that house from other camera positions, and subsequently determine which of the detected points are the same. Some implementations generate synthetic images with different perspectives of a given point, so that when the point appears in a different camera's view, despite its different visual appearance from that view, the computer has been trained to recognize it as a match.

Some implementations render the house in 3D using the cameras' visual data, such that a training set built from that 3D representation inherently comprises 3D data for its underlying features in addition to the visual appearance in such synthetic rendering, as opposed to a 2D feature in a synthetic image as in the prior art. This is performed by "texturing" (applying visual data of the image) a plurality of façade masks derived from a ground truth model.

Figure 3B:
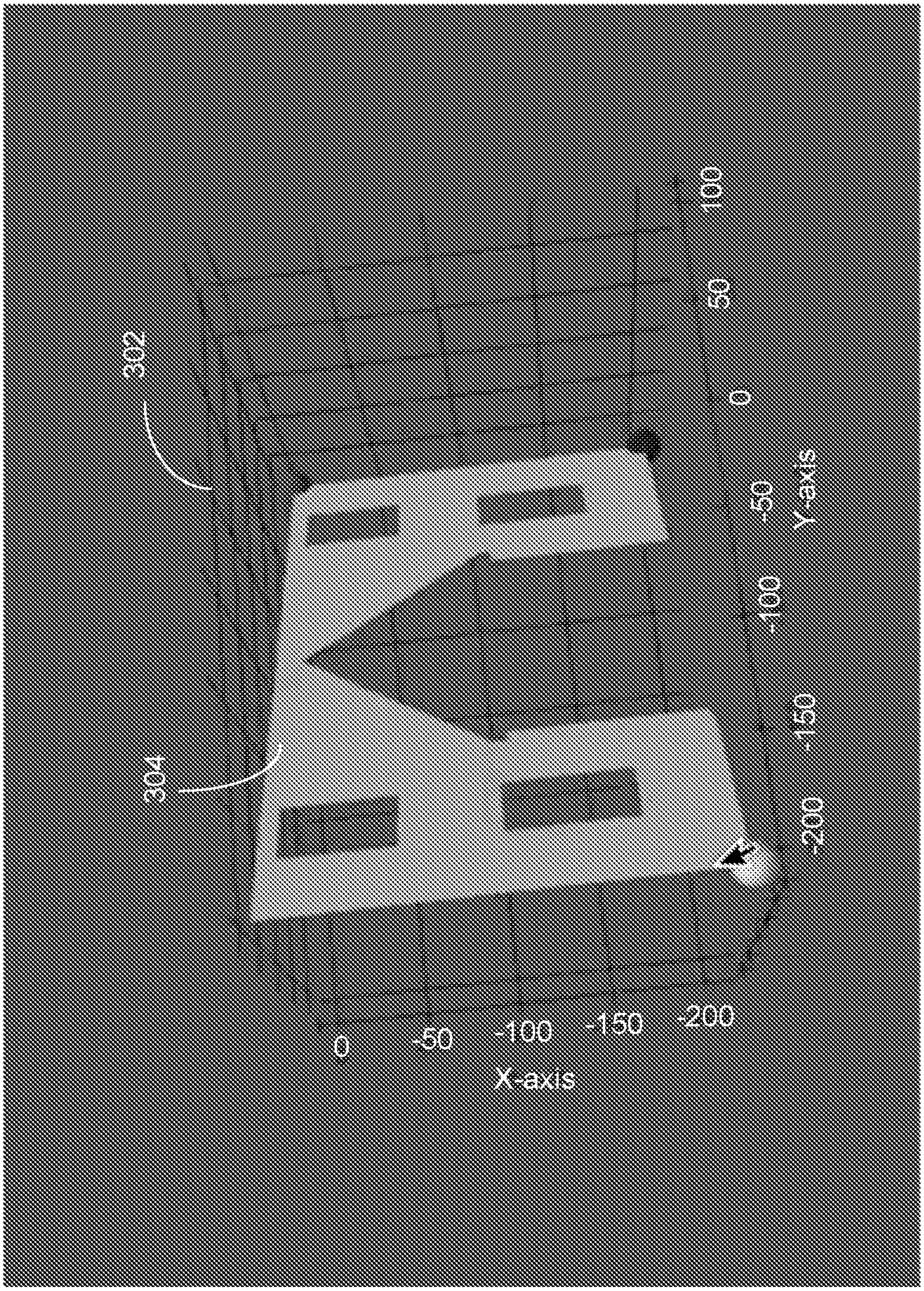
FIG. 3B shows a slice of a front facade of the house shown in FIG. 3A, according to some implementations.

Some implementations obtain a geometric multi-dimensional model of a building structure, the model includes a camera solution and image data used to generate that model. This is sometimes called the ground truth data. Some implementations apply a minimum bounding box to each façade in that model. The façade itself is a 2D plane, even though it lives in a 3D coordinate system. This isolates the façade. FIG. 3B shows a slice 304 of a front façade of the house 300 shown in FIG. 3A, within 3-D coordinate system 302, according to some implementations. Because the façade slice is extracted from the model, the system obtains a perfect template of what that façade should look like. Some implementations apply a bounding box to an already isolated façade slice, e.g. to assist with scaling visual data templates or identify cameras that observe a façade as explained elsewhere.

Figure 3C:
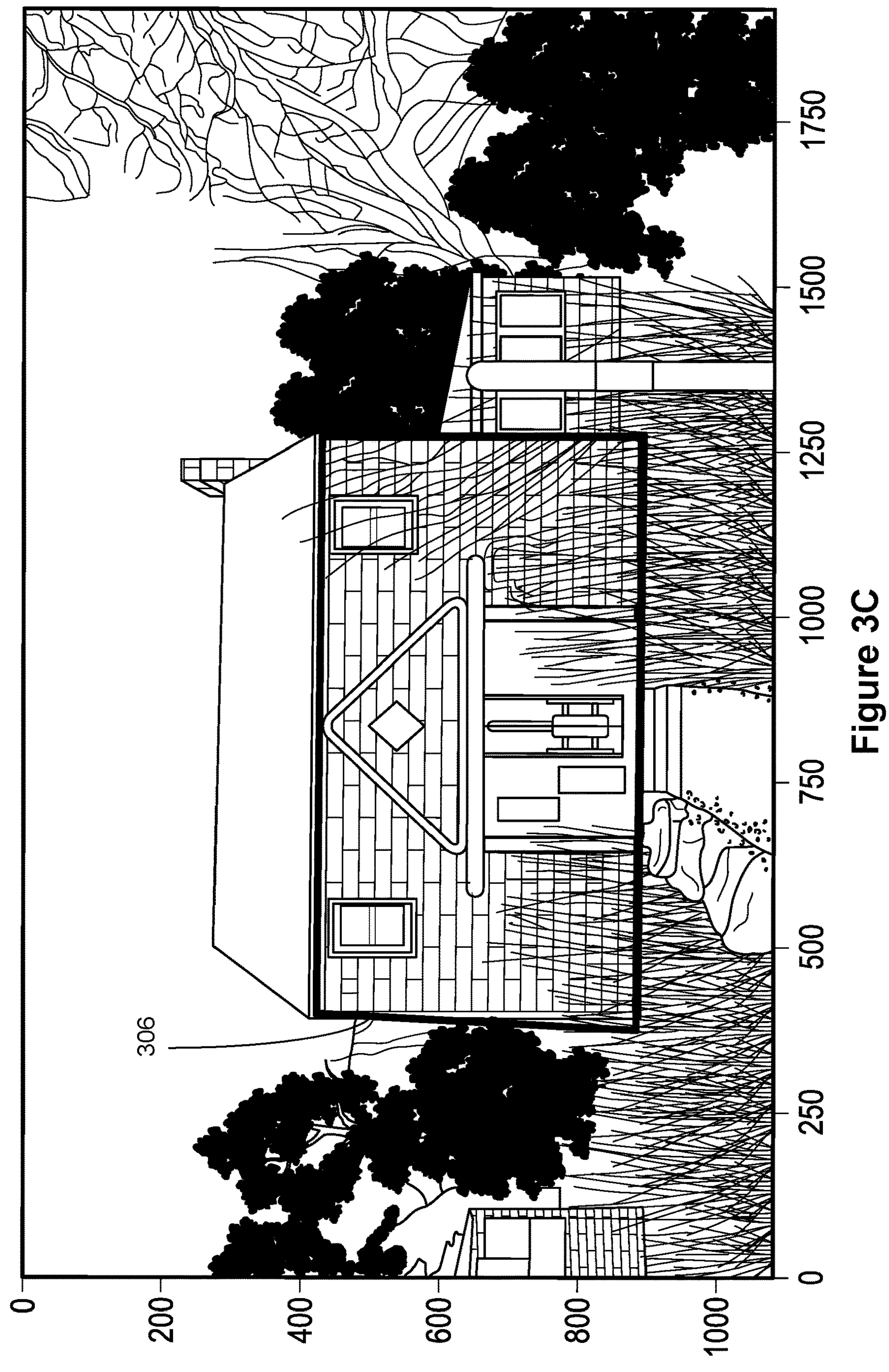
FIGS. 3C, 3D, and 3E show a bounding box projected into images, according to some implementations.
Figure 3D:
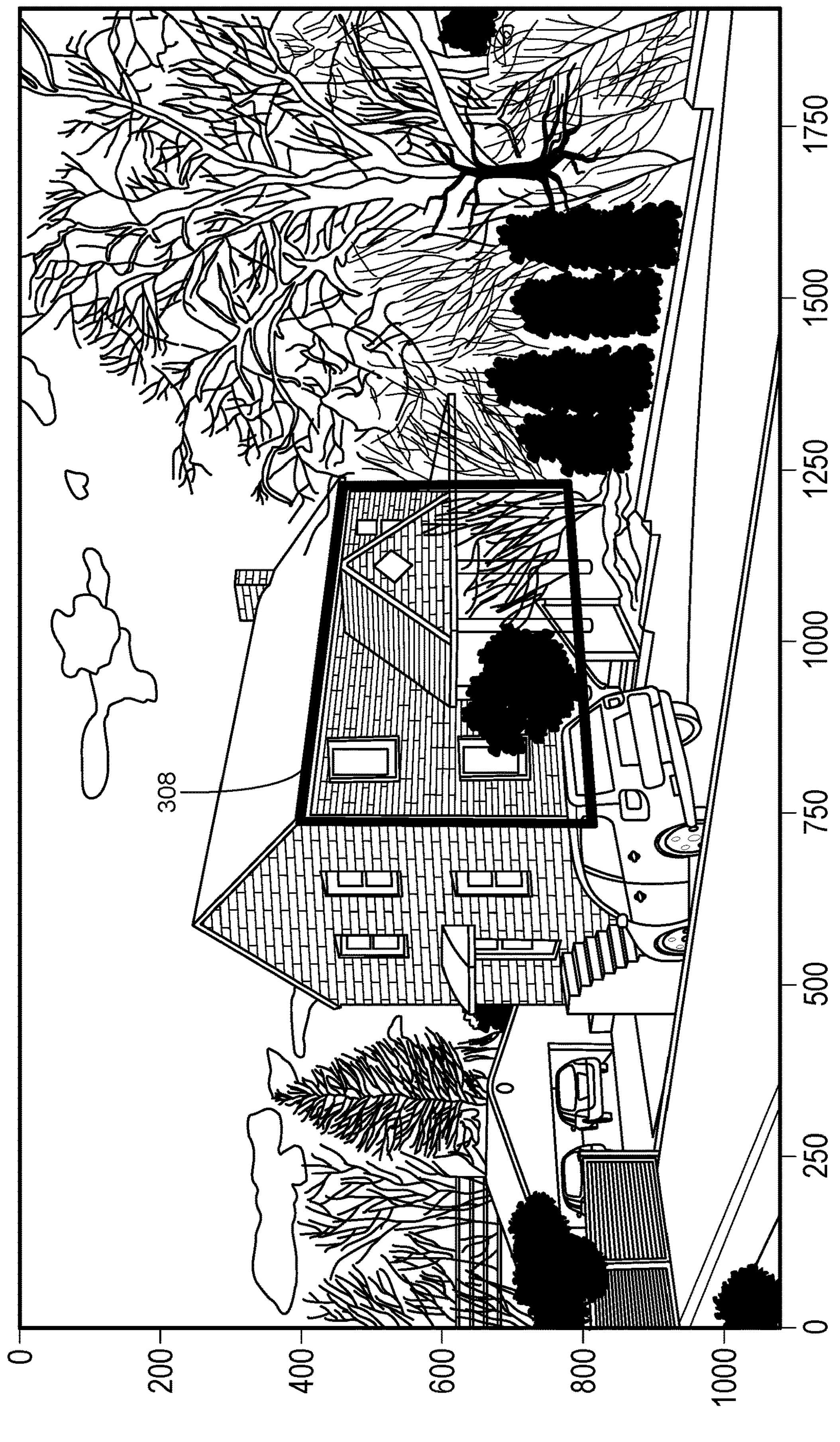
Figure 3E:
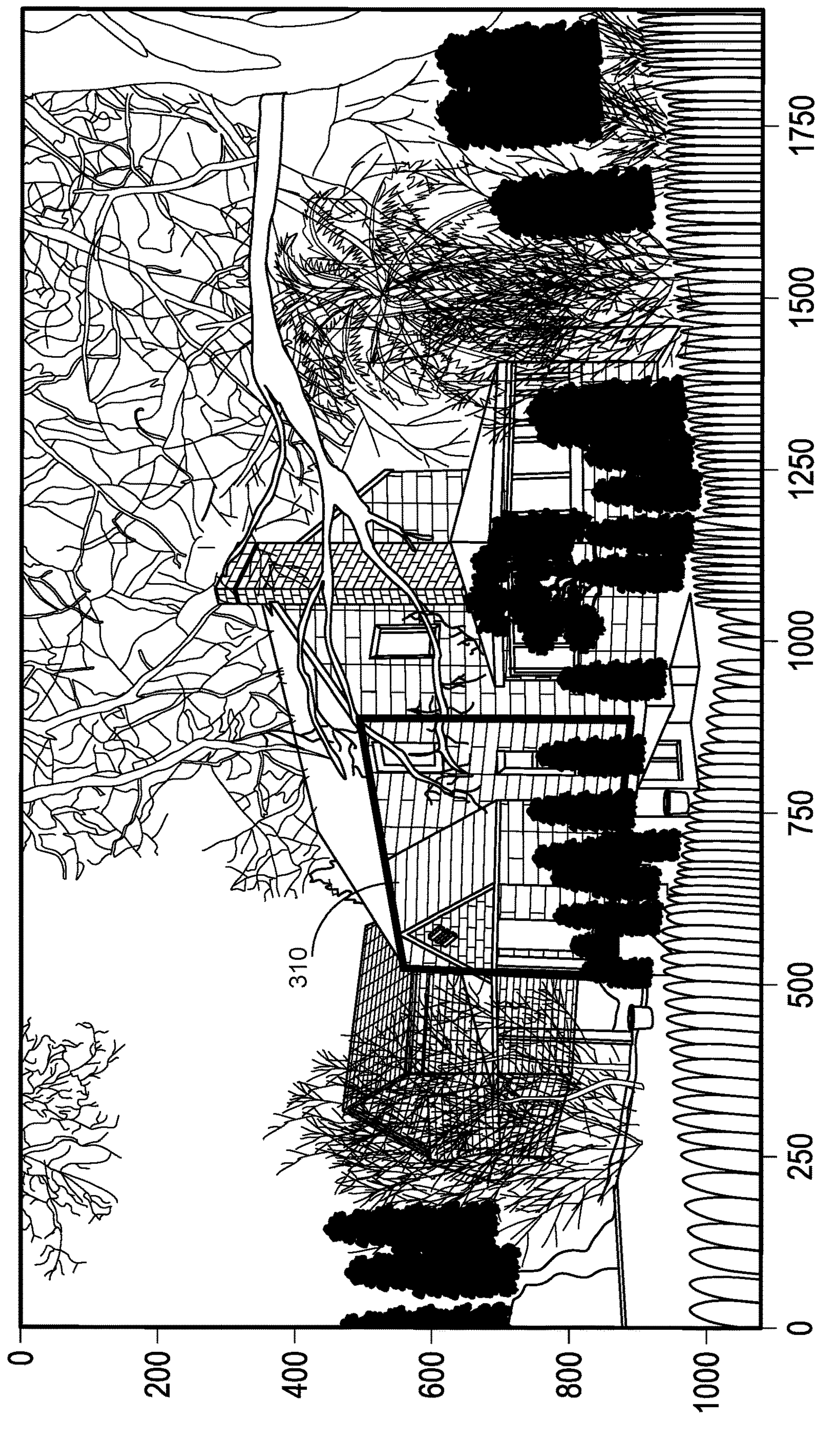

Some implementations subsequently gather, and in some implementations project, visual data of cameras that viewed that façade for that façade slice. To ascertain which visual data to project, some implementations reproject the boundaries of the bounding box back into the images, this shows which images can "see" that façade. For example, bounding boxes 306, 308, and 310, each based on the bounding box that generated façade slice 304, are reprojected into the images as shown in FIGS. 3C, 3D, and 3E, respectively, according to some implementations. The visual data from each of these images that falls within the boundaries of the bounding boxes may then be used to apply the images' pixel data to the respective façade. In some implementations, a façade slice is reprojected into an image that has been segmented (such segmentation to identify the broader house structure as a whole). The façade slice may be visually depicted as a visibility mask having pixels classified as such to distinguish it from other segmentation mask values and to contrast and illustrate the façade slice's presence with the broader segmentation mask (as illustrated in this disclosure, the façade slice pixels are white against a black broader segmentation mask).

Across all of these photos or images, each image may be subject to some occlusion such that a full perfect view of the façade (that is otherwise available in the synthetic façade slice taken from the geometric model) and all its visual appearance is not possible from any one image. In other words, simply taking one image and reprojecting its visual data within the bounding box onto the façade slice may not account for every pixel of the façade slice. With a set of partially occluded images, it is necessary to generate cumulative texture information. Some implementations achieve this by accumulating visual information for a façade slice from at least one image. This may be done by photo-texturing a façade slice with visual information from an image and then assembling each photo-textured façade slice with other photo-textured façade slices in 3-D space according to the arrangement of façades as in the original geometric 3-D model. In some implementations, this is performed by generating cumulative visual information for a façade slice according to visibility masks associated with the façade slice. In some implementations, the original geometric 3-D model is photo-textured with the cumulative visual information, e.g., to obtain an aggregate façade view, for each respective façade.

Figure 3F:
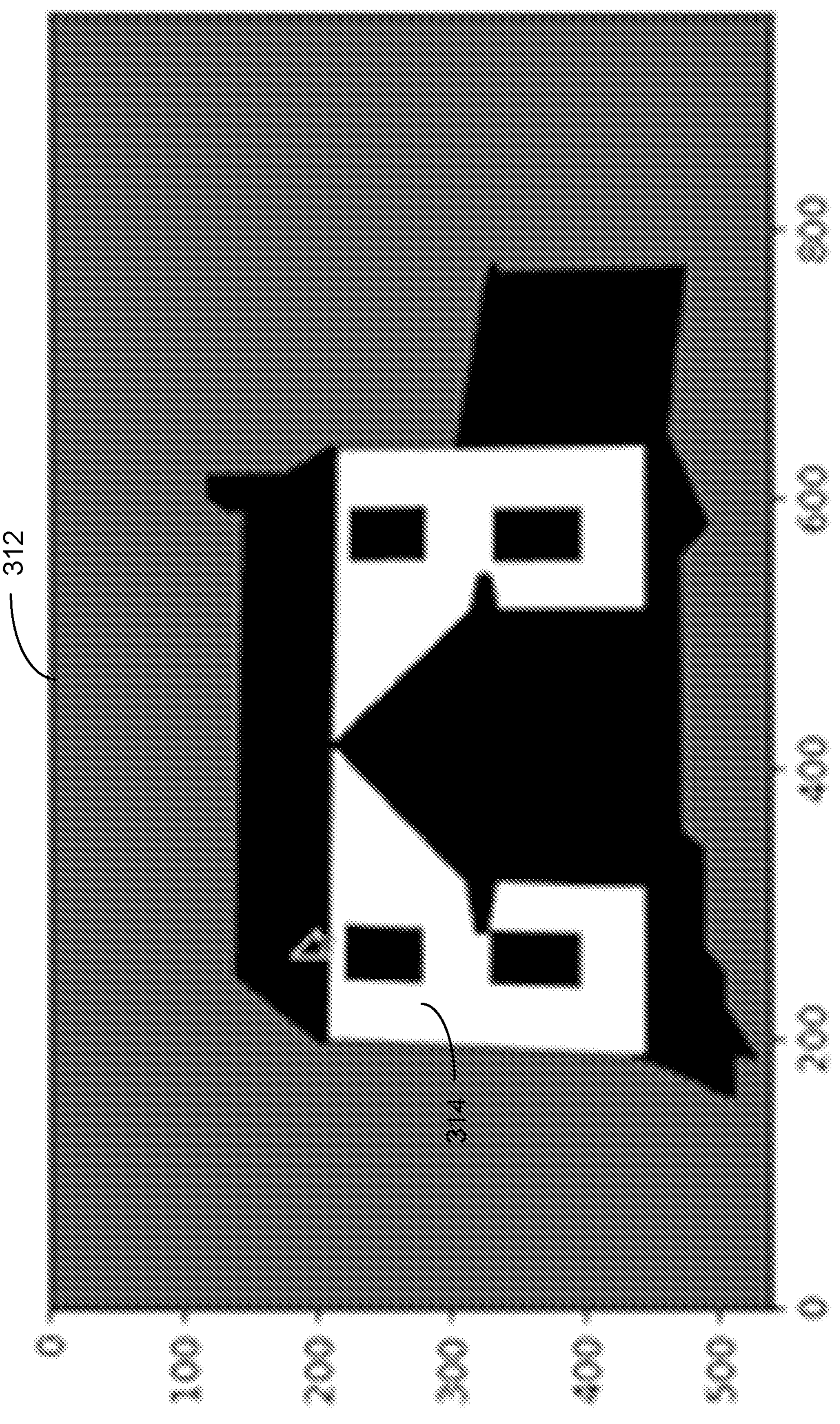
FIGS. 3F, 3G, and 3H show specific façades, e.g. as visibility marks, within a broader segmentation mask, according to some implementations.
Figure 3G:
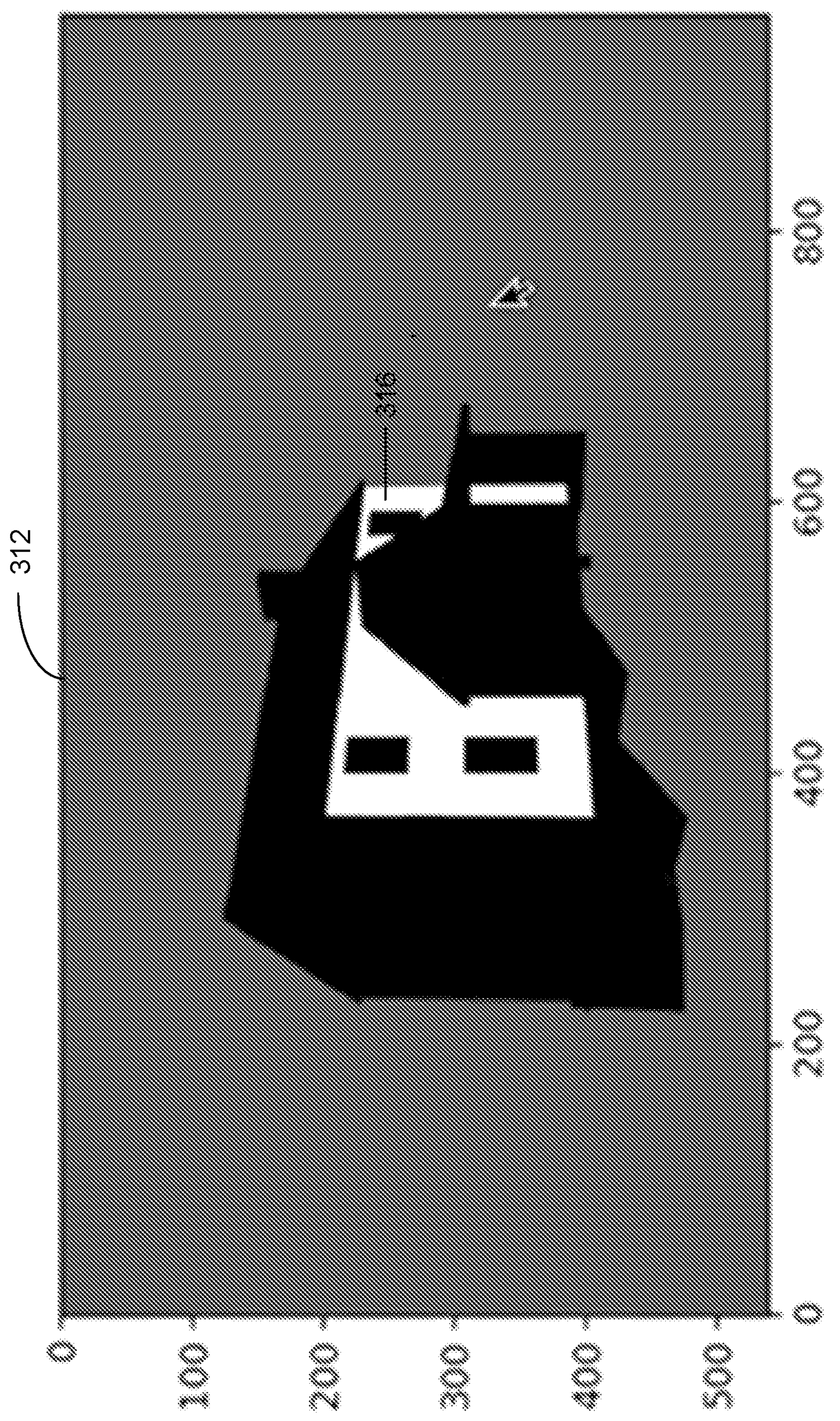
Figure 3H:
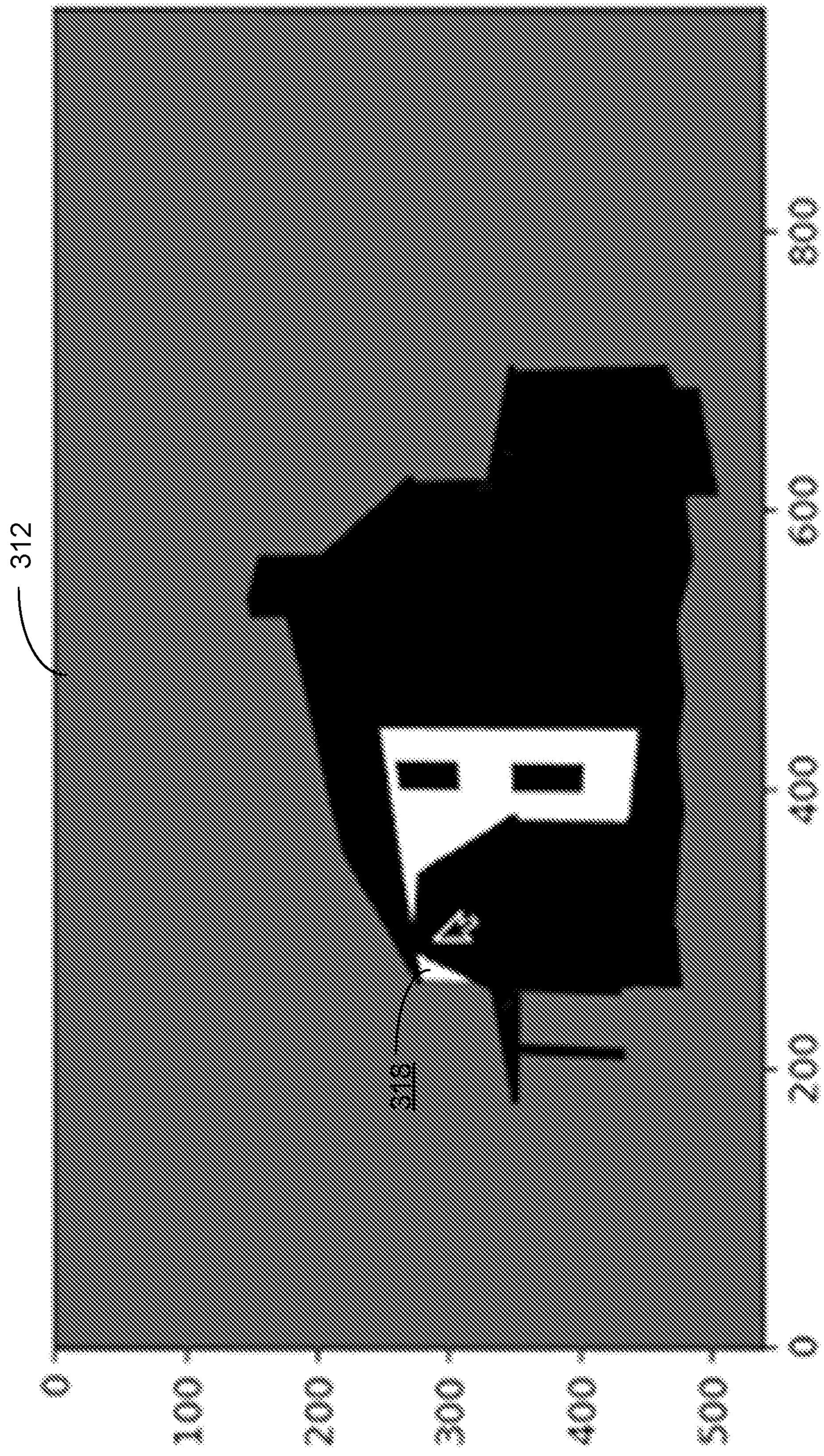

In some implementations, a façade slice is reprojected in an image, as a visibility mask for the façade in question, and may be within a broader segmentation mask of the image. In some implementations, only when a façade has line of sight to the image's render camera will it appear within the segmentation mask (e.g. as white against the broader black segmentation mask in the illustrated examples). For example, FIGS. 3F, 3G, and 3H show a broader black segmentation mask 312, according to some implementations. Because the façade within bounding box 306 is visible in the image shown in FIG. 3C, it is visible as a white portion 314 in FIG. 3F. Similarly, because the façade within bounding box 310 is visible in the image shown in FIG. 3E, it is visible as a white portion 318 in FIG. 3H. And, because the façade within bounding box 308 is visible in the image shown in FIG. 3D, it is visible as a white portion 316 in FIG. 3G.

Figure 3I:
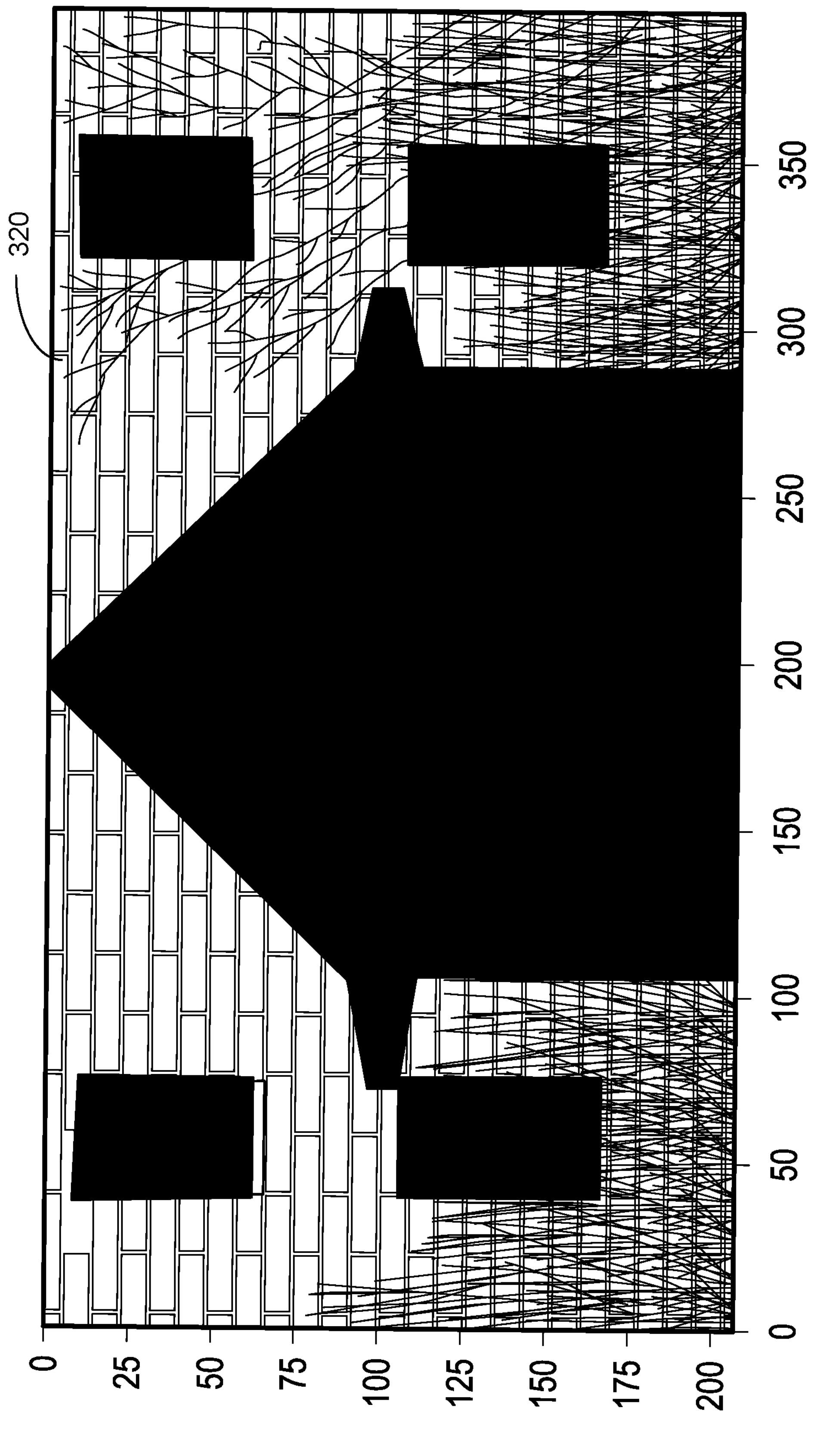
FIGS. 3I, 3J, and 3K show example transformed images, according to some implementations.
Figure 3J:
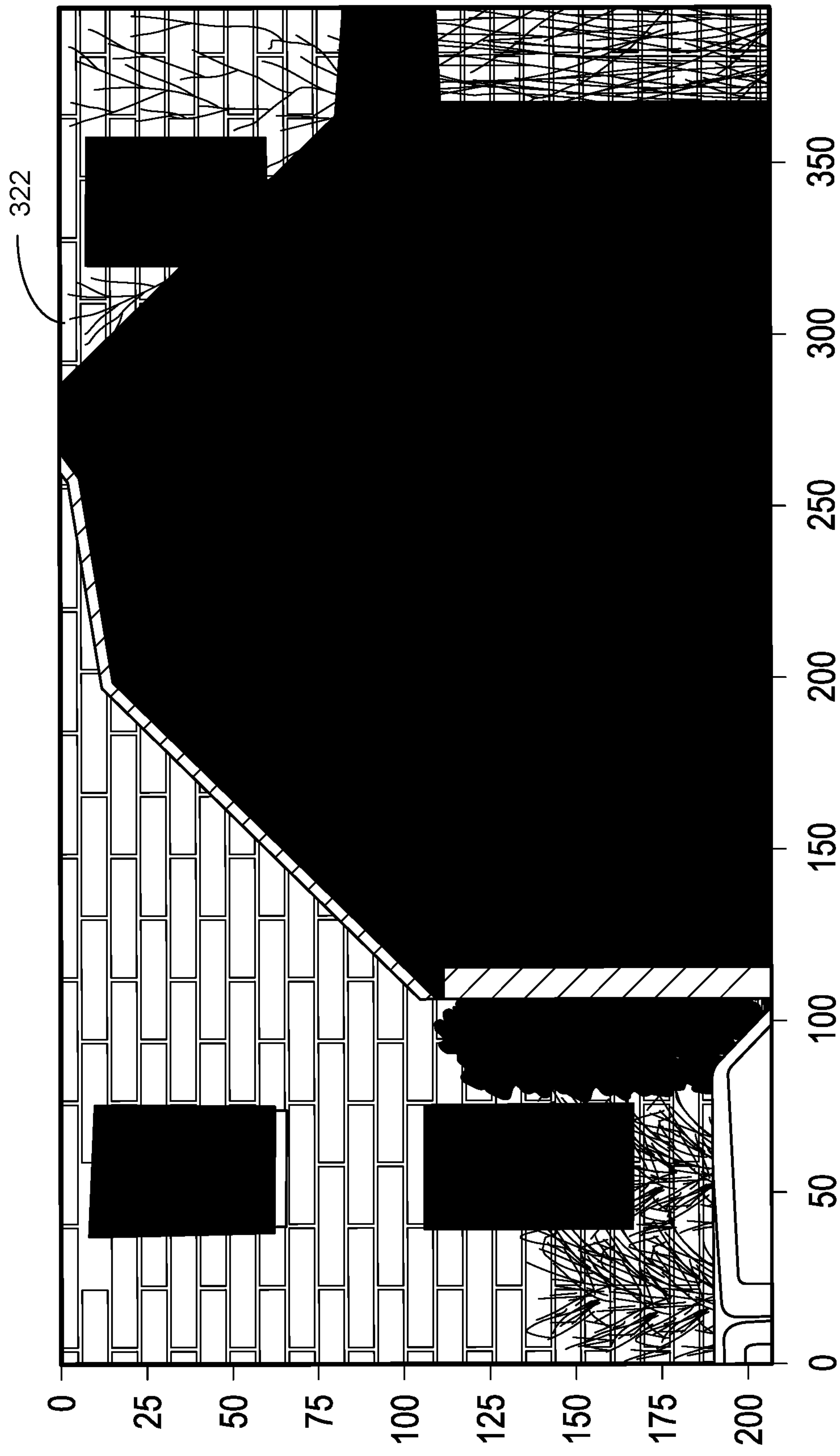
Figure 3K:
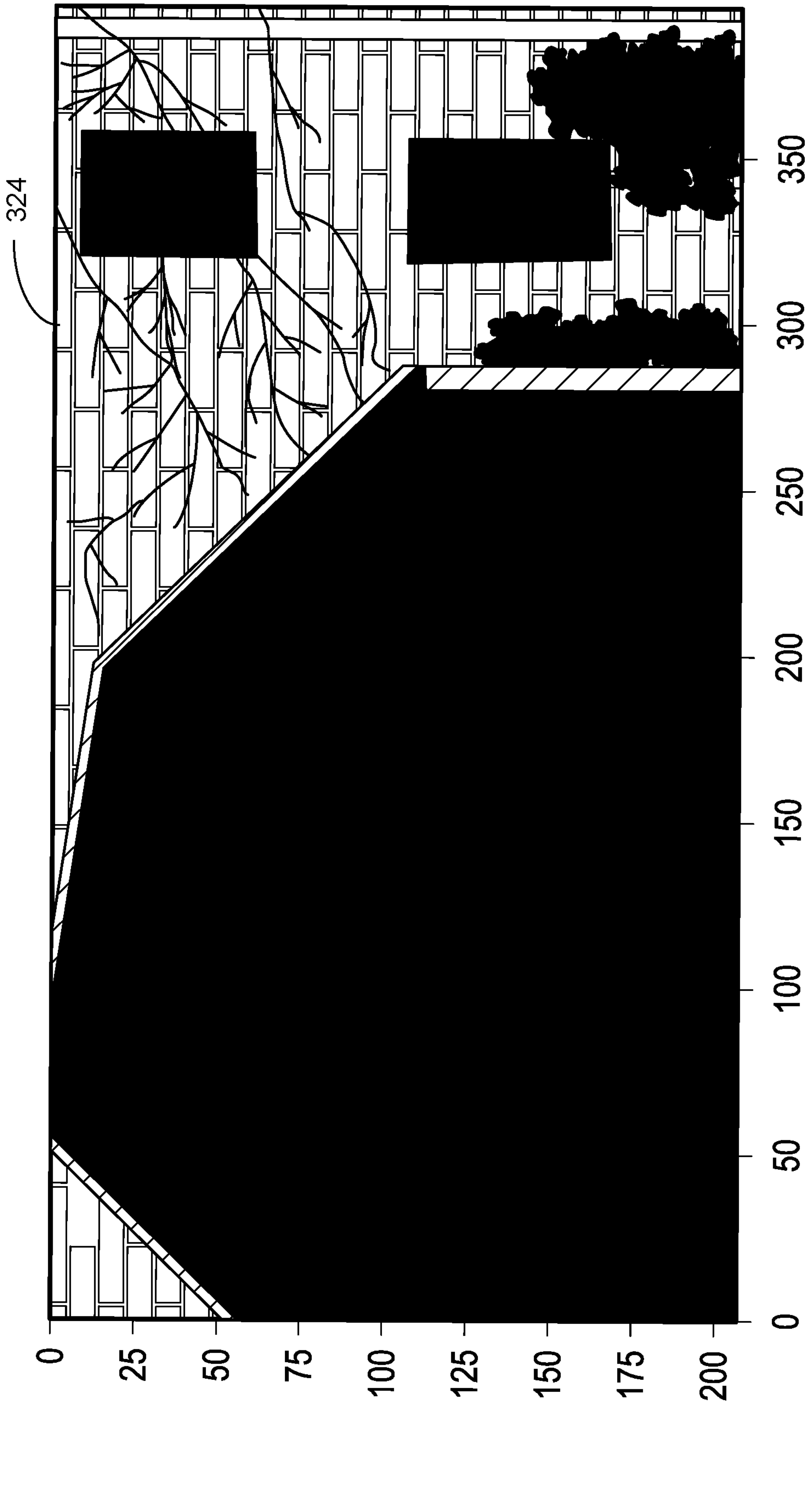
Figure 3L:
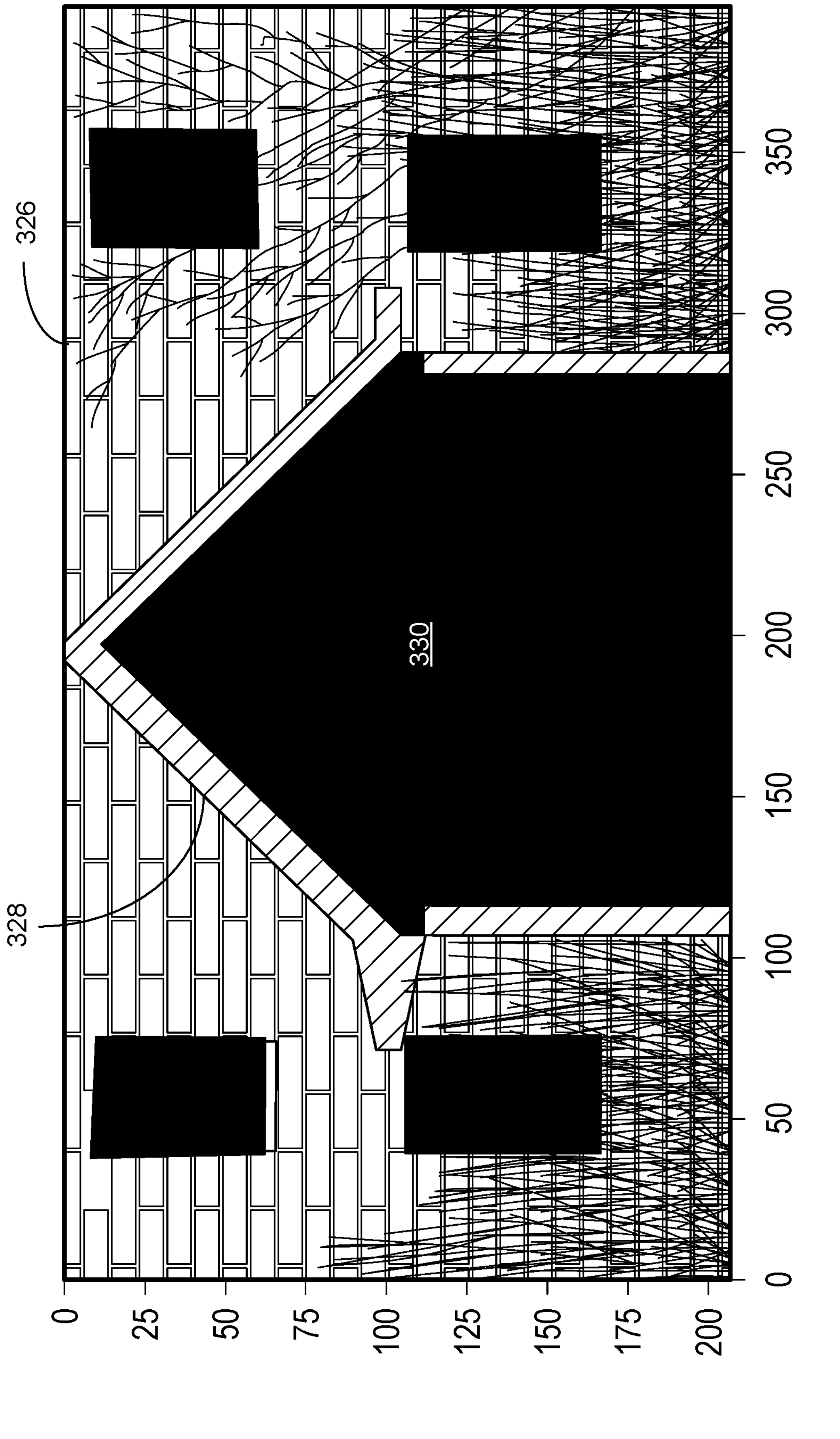
FIG. 3L shows an example aggregate façade view, according to some implementations.

After a façade's visibility is determined with respect to a frame, the image data of a particular image observing that façade may be applied. In some implementations, pixels in an image that correspond to pixels in a visibility mask are used to generate the visual data for a façade slice. In some implementations, the visual data is transformed to a common perspective. In some implementations, the transformation is according to the bounding box of each image observing the façade, such that the transformation aligns the boundaries of the respective bounding boxes. In some implementations, the transformation is such that the plane of the façade is orthogonal relative to the render camera's optical axis. Some implementations use homogeneous transformation for this purpose, or more specifically according to a homography. FIGS. 3I, 3J, and 3K show example transformed images 320, 322, and 324, respectively, according to some implementations, for the front façade as an example. By applying homogeneous transformations with respect to a façade's dimensions within a respective bounding box, each of the transformed façade contents are to scale of the other. Because the bounding box is a minimum for each image, the scale will automatically be the same for content within the bounding box. Its serves as a relative calibration.

The visual data from each of these images are now merged. Some implementations choose the visibility mask described above that has the largest observed pixel volume for the façade or façade slice as a base template. For example, FIG. 3I illustrates using the visual data of the image from FIG. 3C as its base template. While this image generally has good visibility of the front façade, there are portions that are occluded by the structure itself.

In some implementations, pixels from the other images that would be in the unobserved area of the base template are applied or merged. For example, in FIG. 3J, the visual information applied from the image of FIG. 3C is augmented with the visual information of the image from FIG. 3D for new portions relative to the visibility masks of image 3C and 3D. In other words, the visibility mask of the image from FIG. 3D includes additional pixels that the visibility mask of the image from FIG. 3C does not observe (they are occluded). When the visual information of the image from FIG. 3D is applied to the new visibility mask portions and combined with the visual information of FIG. 3I, the new visual information depicted in FIG. 3J as diagonal lines generates more visual data for the façade. The same occurs with the visibility mask and additional visual information of the image from FIG. 3E, as shown in FIG. 3K. When the visibility mask and visual information is aggregated across all images that view a particular façade, the result is an aggregate façade view, an example of which is shown as image 326 in FIG. 3L, according to some implementations. Portions 328 around the middle were occluded in the base template visibility mask (based on the image from FIG. 3C), but filled in from the other images' visual information and visibility masks. In some implementations, for each façade, the system then assembles each slice in 3D according to the ground truth model to generate a visual 3D representation of the visual input.

Figure 3M:
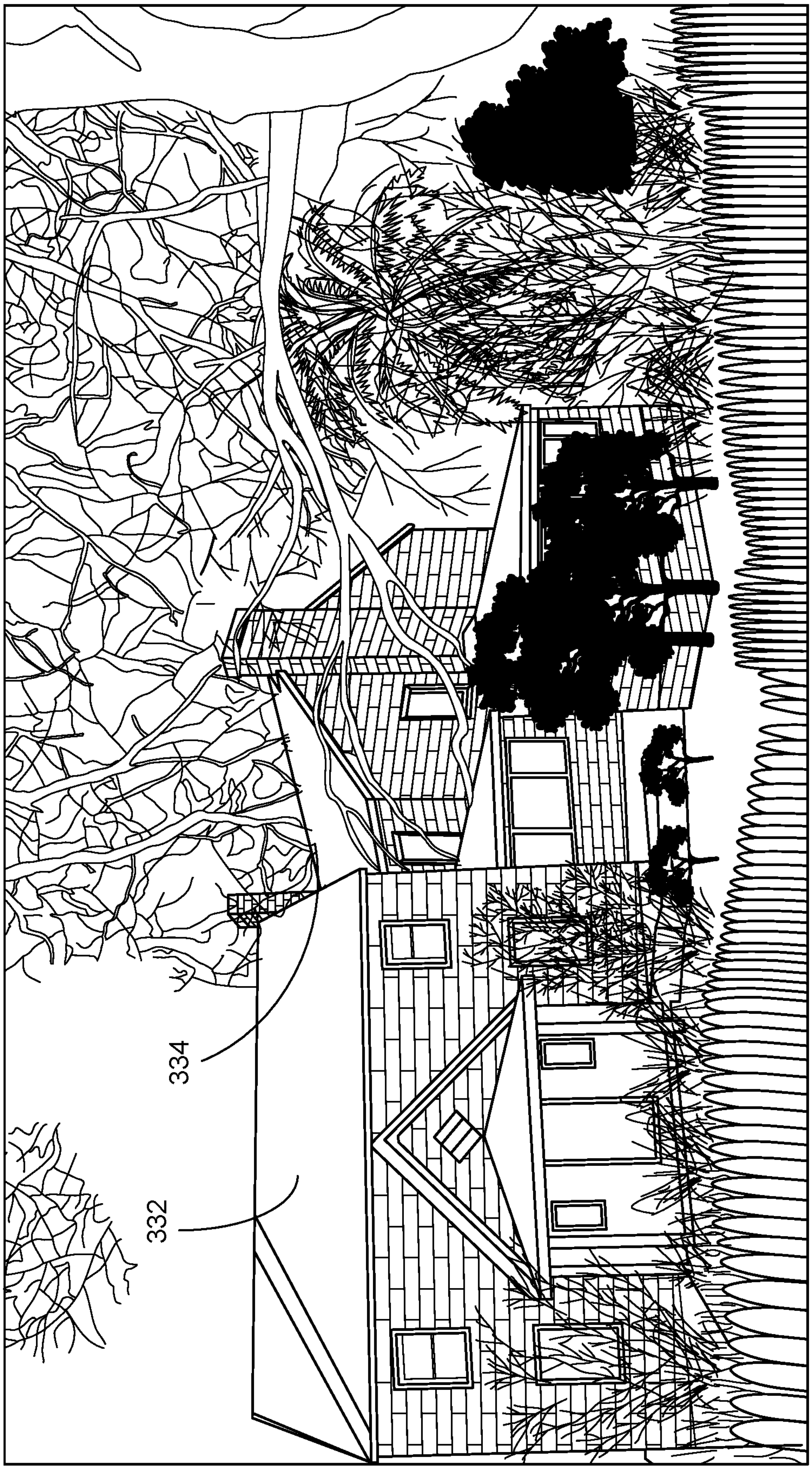
FIGS. 3M and 3N show a 3D representation being moved on top of an original image to show relative changes of an object caused by perturbations, according to some implementations.
Figure 3N:
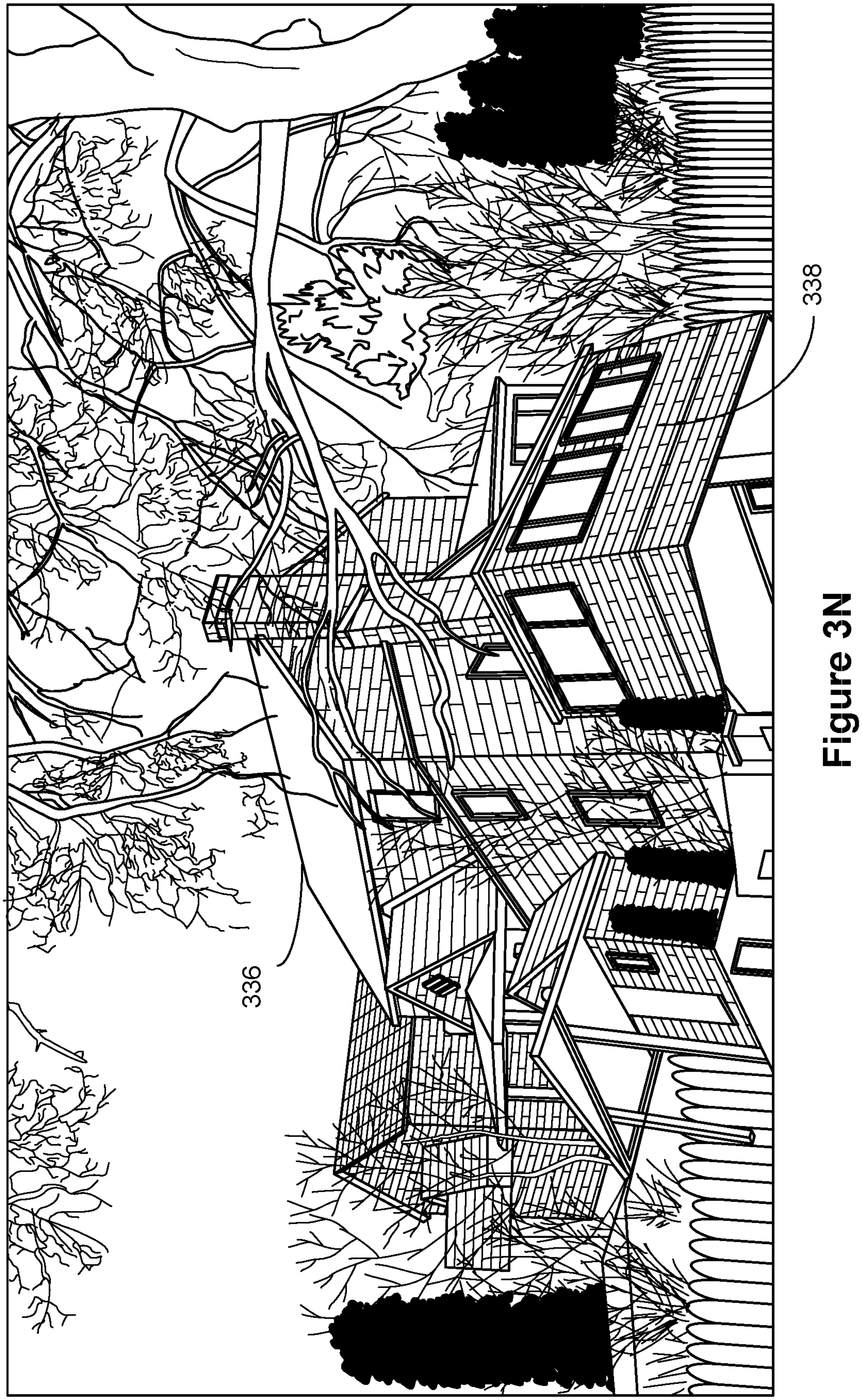

This 3D representation may be moved around, rotated, and/or zoomed, relative to the render camera or display camera (e.g. a virtual camera). In some implementation, a real camera position from the camera solution is used. A plurality of images at each perturbation may be made of the house in that position. Examples in FIGS. 3M and 3N show the 3D representation being moved (see representations 332 and 336, respectively, in FIGS. 3M and 3N) on top of an original image (see building 334 in both FIGS. 3M and 3N) to show the relative changes of the object (or the building 334) by such perturbation. In some implementations, the underlying 2D image may not be rendered.

Example Method for Generating Training Datasets

FIGS. 4A-4E provide a flowchart of a method 400 for generating training datasets, in accordance with some implementations. The method 400 is performed in a computing device (e.g., the device 108 and one or more modules of the training data generation module 250). The method includes obtaining (402) a model of a building that includes a camera solution and a plurality of images of a building structure (e.g., images of the house 102 captured by the image capturing device 104, received from the image related data 274, or retrieved from the image data 234, processed by a camera solve, such as a Structure-from-Motion (SfM) solver). For example, the receiving module 214 receives images captured by the image capturing device 104, according to some implementations.

Figure 4A:
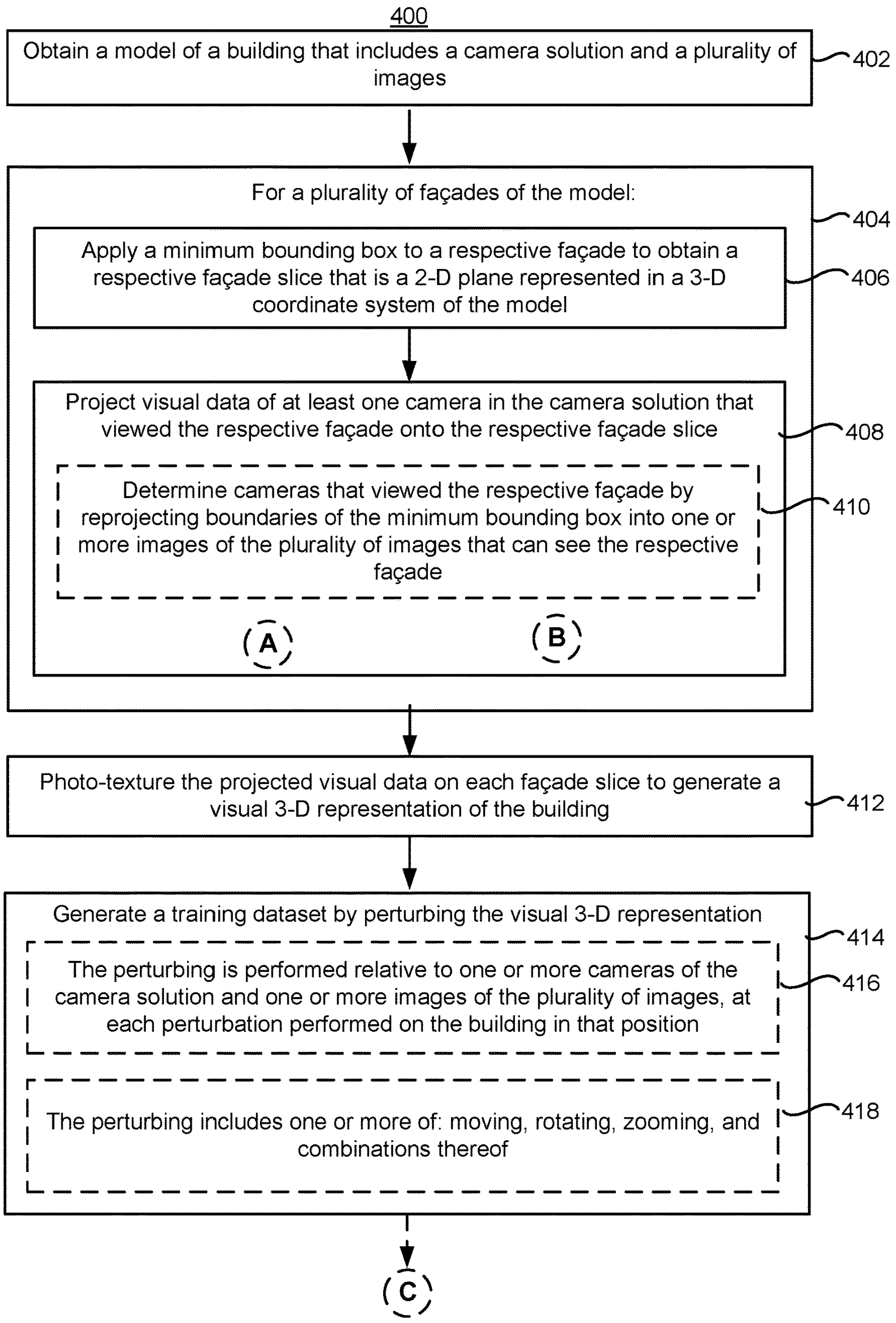
FIGS. 4A-4E provide a flowchart of a method for generating training datasets, in accordance with some implementations.

Referring now back to FIG. 4A, the method also includes, performing (404) for a plurality of façades of the model: applying (406) a minimum bounding box (e.g., by the minimum bounding box module 220) to a respective façade to obtain a respective façade slice that is a 2-D plane represented in a 3-D coordinate system of the model; and projecting (408) visual data (e.g., by the visual data projection module 222) of at least one camera in the camera solution that viewed the respective façade onto a visibility mask associated with the respective façade slice. Visual data may be derived from the plurality of images, so there is a mapping between an image and a camera that captured the image, in some implementations; photo-texturing (412) (e.g., by the photo-texturing module 224) the projected visual data onto each façade slice or the geometric 3-D model to generate a visual 3-D representation of the building; and generating (414) (e.g., by the training dataset generation module 226) a training dataset by perturbing the visual 3-D representation.

In some implementations, the perturbing is performed (416) relative to one or more cameras of the camera solution and one or more images of the plurality of images, at each perturbation performed on the building in that position. In some implementations, the perturbing includes (418) one or more of: moving, rotating, zooming, and combinations thereof.

In some implementations, the method further includes determining (410) cameras that viewed the respective façade by reprojecting boundaries of the minimum bounding box into one or more images of the plurality of images.

Figure 4B:
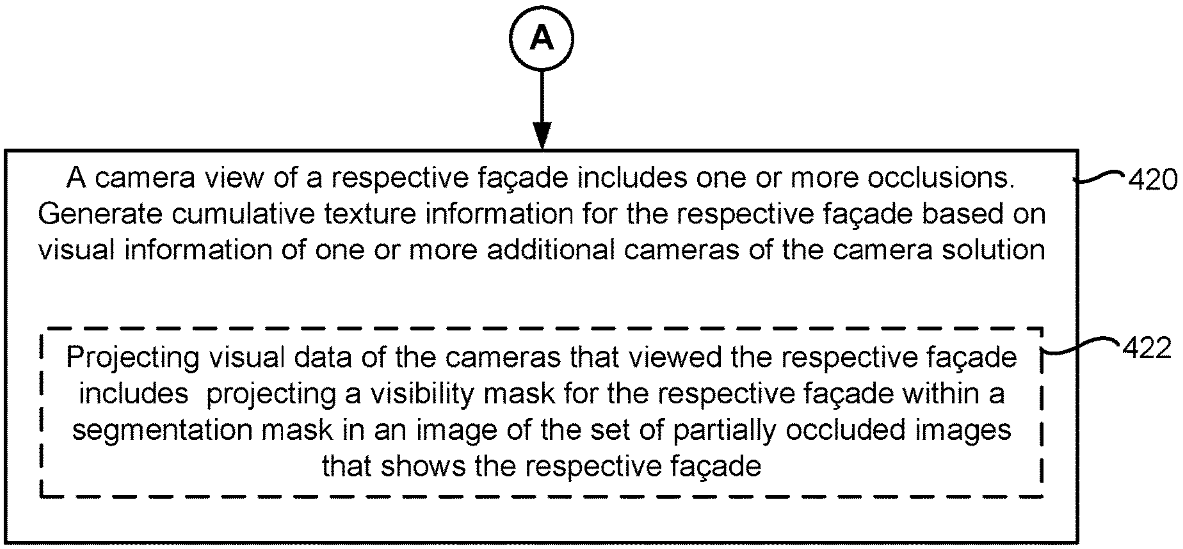

Referring next to FIG. 4B, in some implementations, a camera view of a respective façade comprises one or more occlusions (such that a full perfect view of the respective façade and all its visual appearance is not possible from any one image). The method further includes generating (420) cumulative texture information for the respective façade based on visual information of one or more additional cameras of the camera solution. In some implementations, generating the cumulative texture information includes projecting (422) a visibility mask for the respective façade within a segmentation mask in an image of the set of partially occluded images that shows the respective façade.

Figure 4C:
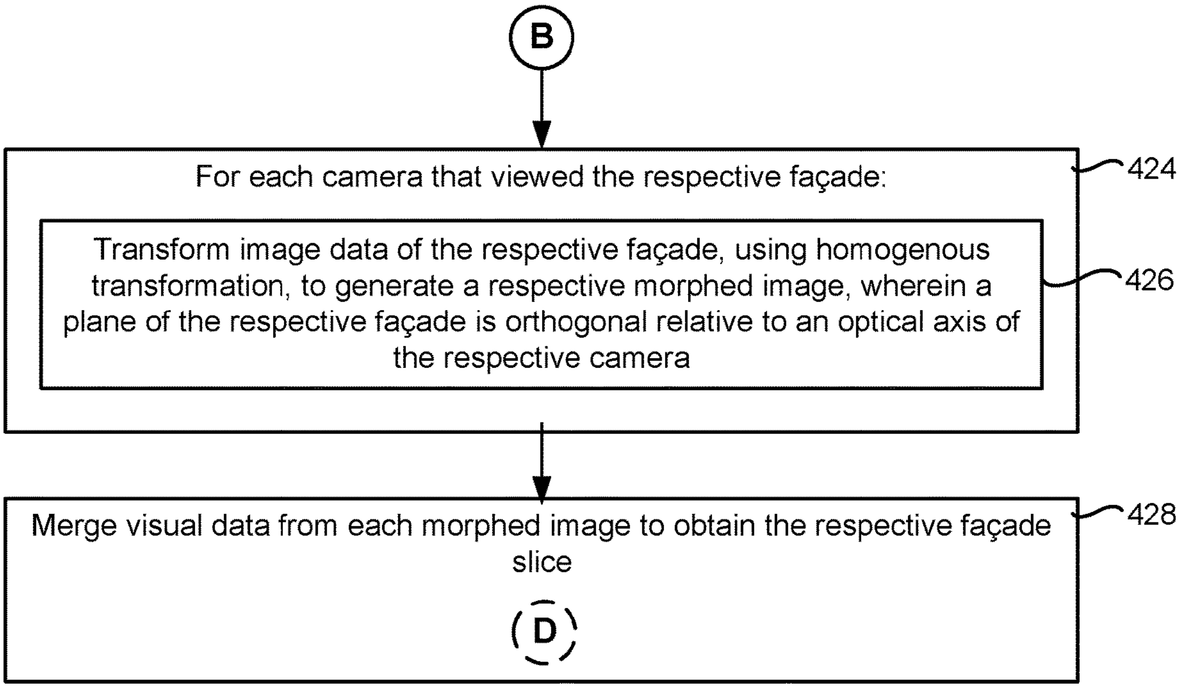
Figure 4D:
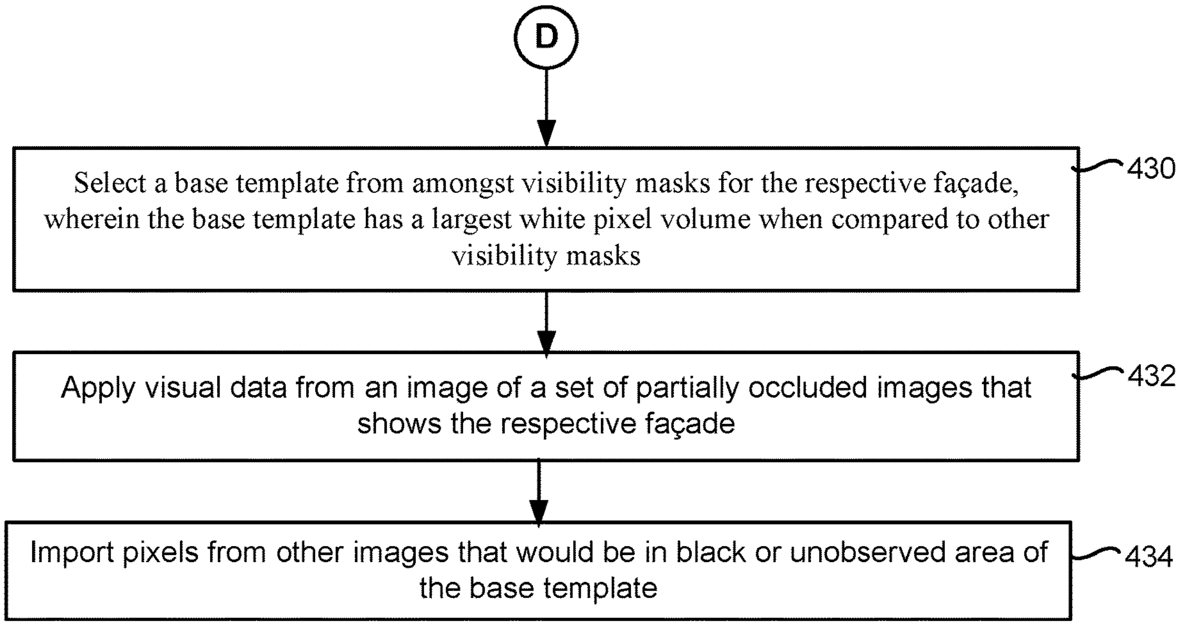

Referring next to FIG. 4C, projecting visual data of the cameras that viewed the respective façade includes: performing (424) for each camera that viewed the respective façade: transforming (426) image data (sometimes called visual data) of the respective façade, using homogenous transformation, to generate a respective morphed image. In some implementations, a plane of the respective façade is orthogonal relative to an optical axis of the respective camera; and merging (428) visual data from each morphed image to obtain the cumulative visual information for a respective façade slice (sometimes called an aggregate facade view). Referring next to FIG. 4D, in some implementations, merging the visual data includes selecting (430)

a base template from amongst visibility masks for the respective façade. The base template has a largest pixel volume for the given façade slice when compared to other visibility masks; applying (432) visual data from an image of a set of partially occluded images that shows the respective façade; and importing (434) pixels from other images that would be in unobserved area of the base template.

Figure 4E:
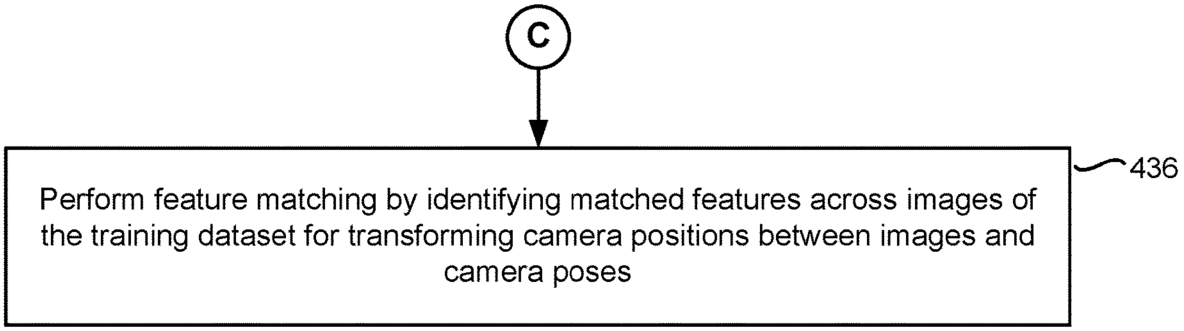

Referring next to FIG. 4E, in some implementations, the method further includes performing (436) feature matching by identifying matched features across images of the training dataset.

In this way, the techniques provided herein generate training data for feature matching algorithms.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating training data for feature matching among images of a building structure, the method comprising:

obtaining a geometric model of a building that includes a camera solution and a plurality of images used to generate the geometric model;

for a plurality of façades of the geometric model:

applying a minimum bounding box to a respective façade to obtain a respective façade slice that is a 2-D plane represented in a 3-D coordinate system of the geometric model; and projecting visual data of at least one camera in the camera solution that viewed the respective façade onto a visibility mask associated with the respective façade slice;

photo-texturing the projected visual data to one of the respective façade slice or the geometric model to generate a visual 3-D representation of the building; and generating a training dataset by perturbing the visual 3-D representation.

2. The method of claim 1, further comprising:

determining cameras that viewed the respective façade by reprojecting boundaries of the minimum bounding box into one or more images of the plurality of images.

3. The method of claim 1, wherein a camera view of a respective façade comprises one or more occlusions of the respective façade, the method further comprising:

generating cumulative texture information for the respective façade based on visual information of one or more additional cameras of the camera solution.

4. The method of claim 3, wherein generating the cumulative texture information comprises:

projecting a visibility mask for the respective façade within a segmentation mask in an image of a set of partially occluded images that shows the respective façade.

5. The method of claim 1, wherein projecting visual data of cameras that viewed the respective façade comprises:

for each camera that viewed the respective façade:

transforming image data of the respective façade to generate a respective morphed image; and merging visual data from each morphed image to the respective façade slice.

6. The method of claim 5, wherein transforming the image data of the respective façade uses a homogenous transformation.

7. The method of claim 5, wherein generating the respective morphed image orients a plane of the respective façade orthogonal to an optical axis of a virtual camera viewing the transformed image data.

8. The method of claim 5, wherein merging the visual data comprises:

selecting a base template from amongst visibility masks for the respective façade, wherein the base template has a largest observed pixel volume relative to other visibility masks;

applying visual data from an image of a set of partially occluded images that shows the respective façade; and importing pixels from other images to unobserved areas of the base template.

9. The method of claim 1, wherein the perturbing is performed relative to one or more cameras of the camera solution at each perturbation performed on the visual 3-D representation in that position.

10. The method of claim 1, wherein the perturbing is performed relative to one or more virtual cameras viewing the visual 3-D representation.

11. The method of claim 1, wherein the perturbing includes one or more of: moving, rotating, zooming, and combinations thereof.

12. The method of claim 1, further comprising capturing new images of the visual 3-D representation from each perturbed position.

13. The method of claim 1, further comprising:

performing feature matching by identifying matched features across images of the training dataset for transforming camera positions between images and camera poses.

14. A method for generating training data for feature matching among images of a building structure, the method comprising:

obtaining a geometric model of a building that includes a camera solution and a plurality of images used to generate the geometric model;

for each facade of a plurality of façades of the geometric model, generating a respective façade slice;

identifying a respective camera within the camera solution that observes each façade slice;

for each identified camera, identifying pixels comprising visual data associated with a respective façade slice according to a visibility mask for the respective façade slice within the respective identified camera's associated image;

generating an aggregate façade view of cumulative visual data for the respective façade slice from each identified camera, wherein the aggregate façade view comprises visual pixels from at least one identified camera;

photo-texturing one of the respective façade slice or geometric model with the aggregate façade view to generate a visual 3-D representation of the building; and generating a training dataset by capturing images of the visual 3-D representation from a plurality of perturbed positions.

15. The method of claim 14, wherein generating the respective façade slice comprises isolating a respective façade as a two-dimensional representation in a three-dimensional coordinate system of the geometric model.

16. The method of claim 15, wherein isolating the respective façade further comprises applying a bounding box to the respective façade of the geometric model.

17. The method of claim 16, wherein identifying the respective camera that observes a respective façade slice further comprises:

reprojecting the bounding box into the plurality of images; and recording each camera that observes the bounding box in its associated image.

18. The method of claim 14, wherein the visibility mask is a classification indicating one or more pixels related to a façade slice are observed from the identified camera.

19. The method of claim 14, wherein generating the aggregate façade view further comprises generating one or more visual data templates for the at least one identified camera, wherein each visual data template is a modified image comprising visual pixel data of a façade slice according to visibility mask of the at least one identified camera.

20. The method of claim 19, wherein each visual data template is transformed to a common perspective.

21. The method of claim 20, wherein the common perspective is an orientation with a plane of the modified image orthogonal to an optical axis of a virtual camera displaying the modified image.

22. The method of claim 20, wherein generating the respective façade slice comprises isolating a respective façade as a two-dimensional representation in a three-dimensional coordinate system of the geometric model, wherein isolating the respective façade further comprises applying a bounding box to the respective façade of the geometric model, and wherein the common perspective aligns associated boundaries for the bounding box.

23. The method of claim 14, wherein generating the aggregate façade view further comprises selecting, for each façade slice, a base visual data template, wherein the base visual data template has a largest observed pixel count among each visual data template for the respective façade slice.

24. The method of claim 23, further comprising cumulating the visual pixels of the base visual data template with visual pixels from additional visual data templates for the respective façade slice.

25. The method of claim 14, wherein each perturbed position of the visual 3-D representation is relative to one or more cameras of the camera solution.

26. The method of claim 14, wherein each perturbed position of the visual 3-D representation is relative to a corresponding perspective of a virtual camera.

27. The method of claim 14, wherein a perturbed position of the visual 3-D representation includes one or more of translating, rotating, zooming, or combinations thereof.

28. The method of claim 14, further comprising identifying feature matches across captured images.

29. A computer system for generating training data for a building structure, comprising:

one or more processors, including a general purpose processor and a graphics processing unit (GPU);

a display; and memory;

wherein the memory stores one or more programs configured for execution by the one or more processors, and the one or more programs comprising instructions for;

obtaining a geometric model of a building that includes a camera solution and a plurality of images used to generate the geometric model;

for a plurality of facades of the geometric model:

applying a minimum bounding box to a respective façade to obtain a respective facade slice that is a 2-D plane represented in a 3-D coordinate system of the geometric model; and projecting visual data of at least one camera in the camera solution that viewed the respective façade onto a visibility mask associated with the respective facade slice;

photo-texturing the projected visual data to one of the respective facade slice or the geometric model to generate a visual 3-D representation of the building; and generating a training dataset by perturbing the visual 3-D representation.

30. A non-transitory computer readable storage medium storing one or more programs configured for execution by a computer system having a display, one or more processors including a general purpose processor and a graphical processing unit (GPU), the one or more programs comprising instructions for:

obtaining a geometric model of a building that includes a camera solution and a plurality of images used to generate the geometric model;

for a plurality of facades of the geometric model:

applying a minimum bounding box to a respective façade to obtain a respective façade slice that is a 2-D plane represented in a 3-D coordinate system of the geometric model; and projecting visual data of at least one camera in the camera solution that viewed the respective facade onto a visibility mask associated with the respective facade slice;

photo-texturing the projected visual data to one of the respective facade slice or the geometric model to generate a visual 3-D representation of the building; and generating a training dataset by perturbing the visual 3-D representation.

* * * * *